US011100772B2

(12) United States Patent
Amemiya et al.

(10) Patent No.: US 11,100,772 B2
(45) Date of Patent: Aug. 24, 2021

(54) PSEUDO FORCE SENSE GENERATION APPARATUS

(71) Applicant: NIPPON TELEGRAPH AND TELEPHONE CORPORATION, Tokyo (JP)

(72) Inventors: Tomohiro Amemiya, Tokyo (JP); Hiroaki Gomi, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/968,554

(22) PCT Filed: Feb. 7, 2019

(86) PCT No.: PCT/JP2019/004443
§ 371 (c)(1),
(2) Date: Aug. 7, 2020

(87) PCT Pub. No.: WO2019/156173
PCT Pub. Date: Aug. 15, 2019

(65) Prior Publication Data
US 2021/0043051 A1    Feb. 11, 2021

(30) Foreign Application Priority Data
Feb. 9, 2018 (JP) .............................. JP2018-021691

(51) Int. Cl.
*H04B 3/38* (2006.01)
*G08B 6/00* (2006.01)

(52) U.S. Cl.
CPC ...................................... *G08B 6/00* (2013.01)

(58) Field of Classification Search
CPC ............ G08B 6/00; B06B 1/04; G06F 3/0488; G06F 13/285; G06F 3/01; G06F 3/016; H02K 35/02; H02K 7/1876; H02K 35/04
See application file for complete search history.

(56) References Cited

U.S. PATENT DOCUMENTS 8,384,529 B2 *  2/2013 Sugahara ............... G06F 1/1694
                                                         340/407.1
2018/0188121 A1 *  7/2018 Ono ......................... H01L 41/09

FOREIGN PATENT DOCUMENTS

JP        2015197921        11/2015
JP         201737356         2/2017
(Continued)

OTHER PUBLICATIONS

Amemiya, Tomochiro, et al., "A Device 'Burunabi 3' that produces a Feeling of Being Pulled when Pinched with the Fingers," NTT Technical Journal Sep. 2014, Information Processing Society of Japan Research Report Entertainment Computing (EC) 2015 EC-35 Feb. 23, 2015.
(Continued)

*Primary Examiner* — Toan N Pham

(57) ABSTRACT

The present invention provides a pseudo-force sense to the user without requiring the user holding onto an apparatus. The pseudo-force sense generation apparatus includes: a first contact member and a second contact member that are disposed along an outer peripheral surface of a mounting region, which is a three-dimensional region occupied by a body of the user; a joining member that joins the first contact member to the second contact member; and a vibration element that performs cyclic first asymmetric vibration along a line passing through a virtual point in the mounting region and the first contact member, and transfers a force in a direction along the line based on the first asymmetric vibration to the first contact member. The virtual point is (Continued)

disposed between the first contact member and the second contact member, and the is also transferred to the second contact member via the joining member.

20 Claims, 19 Drawing Sheets

(56) References Cited

FOREIGN PATENT DOCUMENTS

| | | |
|---|---|---|
| JP | 201881459 | 5/2018 |
| WO | 2017183537 A1 | 10/2017 |

OTHER PUBLICATIONS

Ikeda, Izumi, "Traction and Visual Illusions Method for Presenting Contact Feeling with Aerial Projection Object," IPSJ 'SIG Technical Report, vol. 1, 2015—MUS-106 No. 2 Mar. 2, 2015.
Nakamura, Takuto, et al., "Enhancement of Force Perception by Vibration Presentation during Wrist Hanger Reflection," 2015 IPSJ Interacion 2015 C07 Mar. 7, 2015.

* cited by examiner

Fig. 1
Fig. 1A
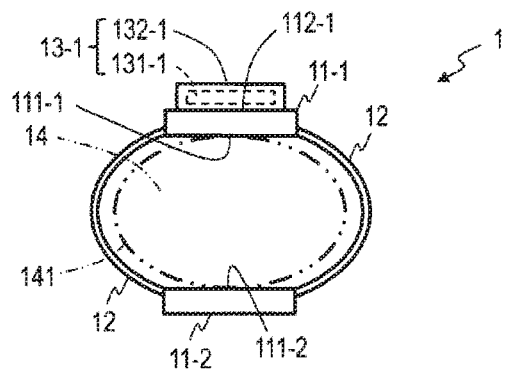
Fig. 1B
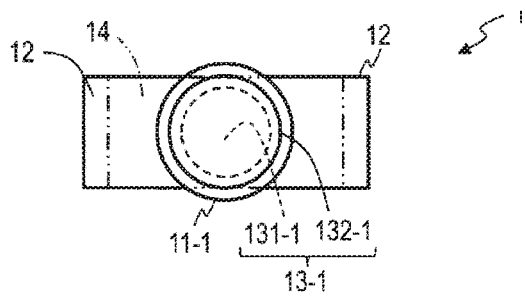
Fig. 1C
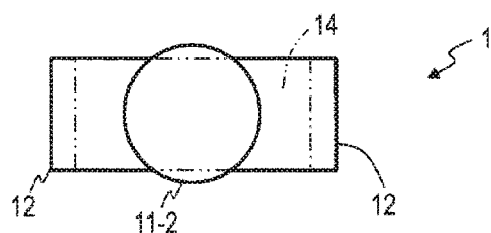
Fig. 1D
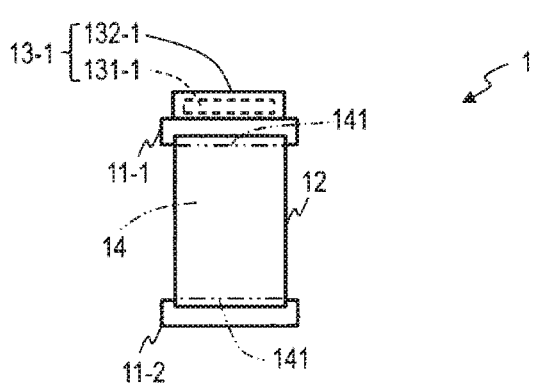

Fig. 2
Fig. 2A
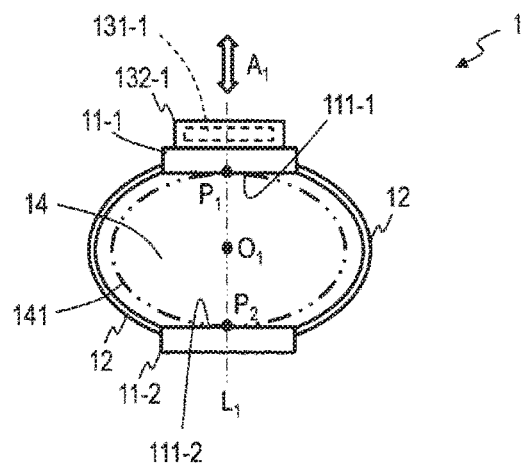
Fig. 2B
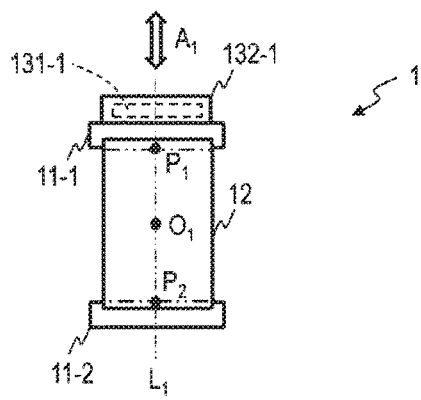
Fig.a 2C
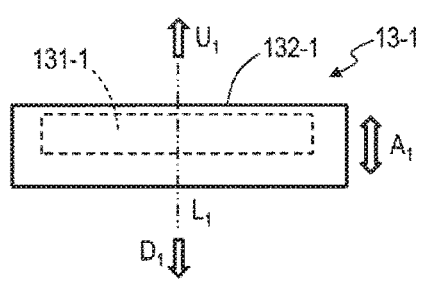
Fig. 2D
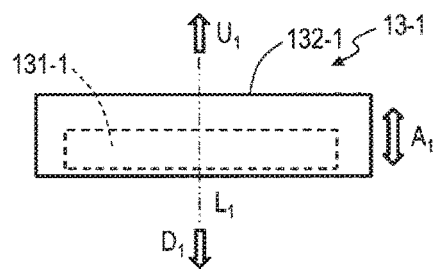

Fig. 5
Fig. 5A
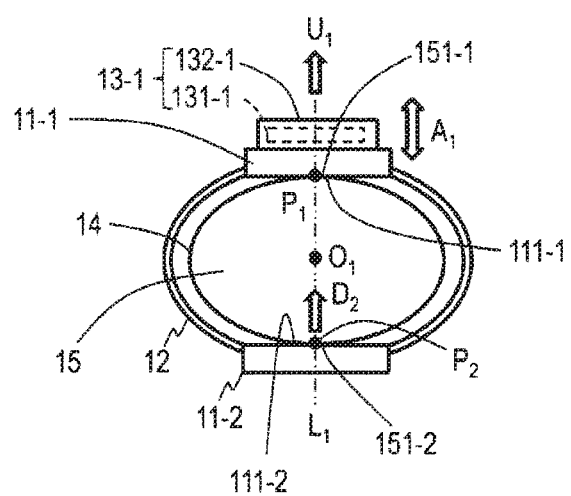
Fig. 5B
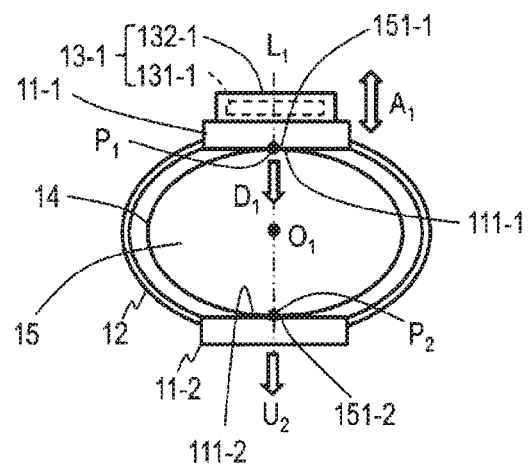

Fig. 6
Fig. 6A
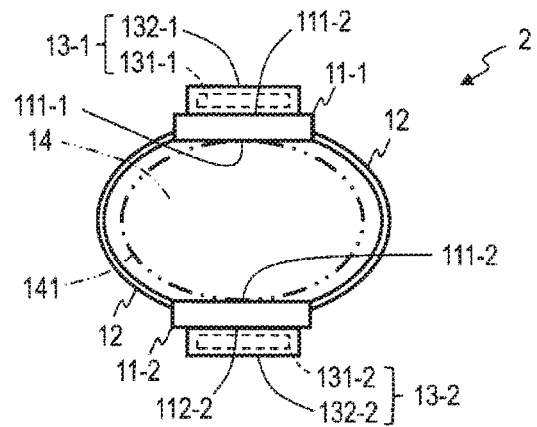
Fig. 6B
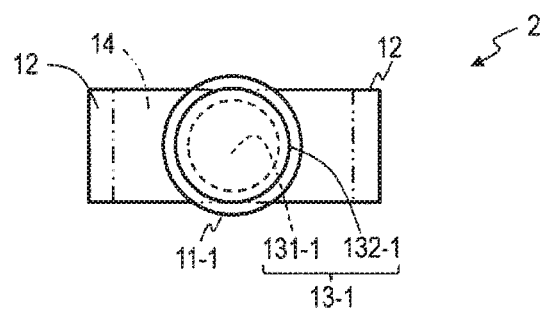
Fig. 6C
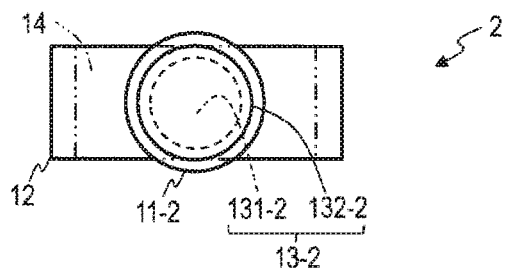
Fig. 6D
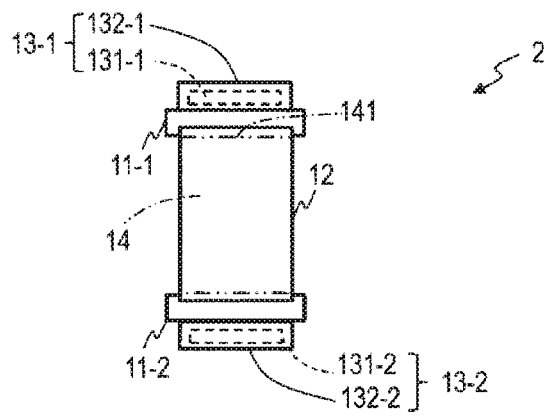

Fig. 8
Fig. 8A
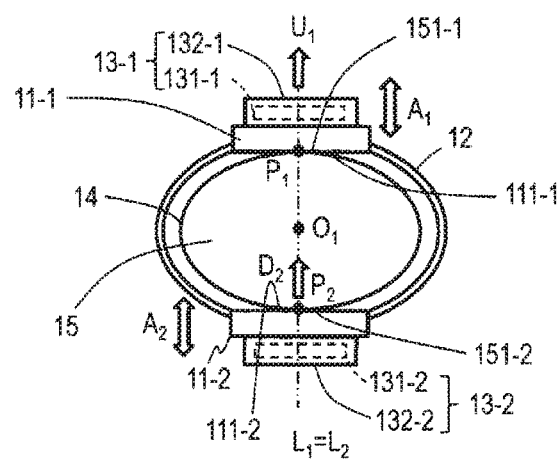
Fig. 8B
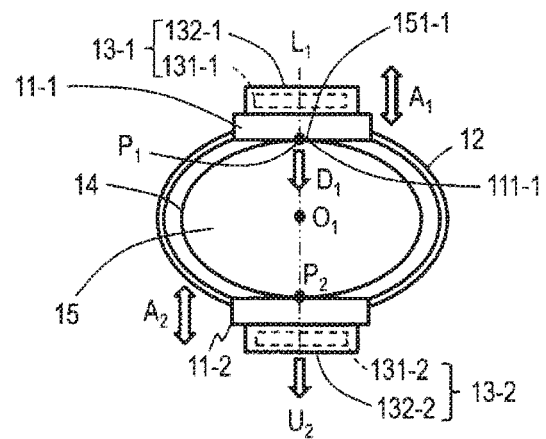
Fig. 8C
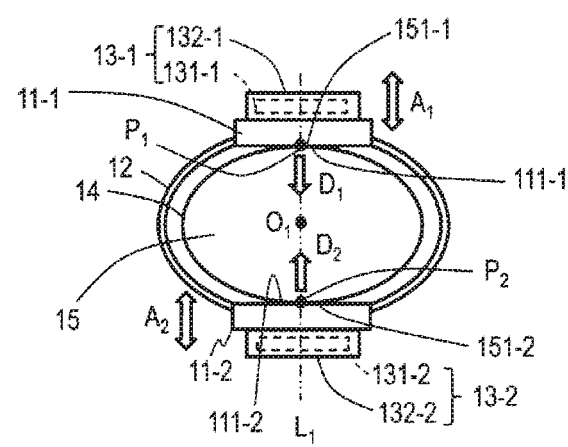

Fig. 9
Fig. 9A
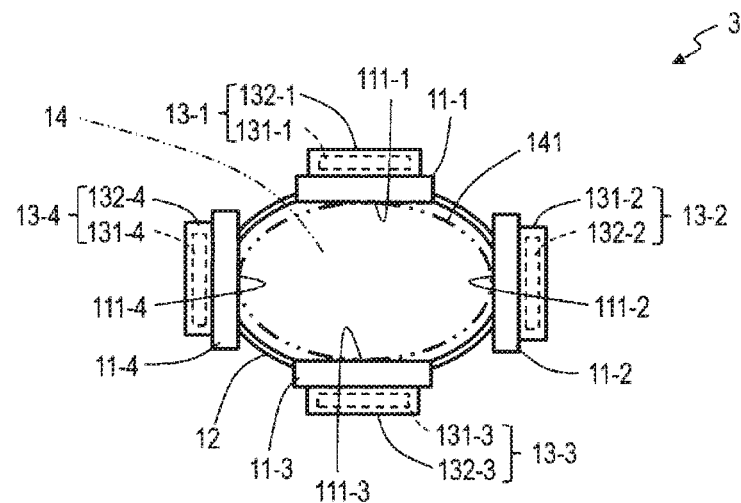
Fig. 9B
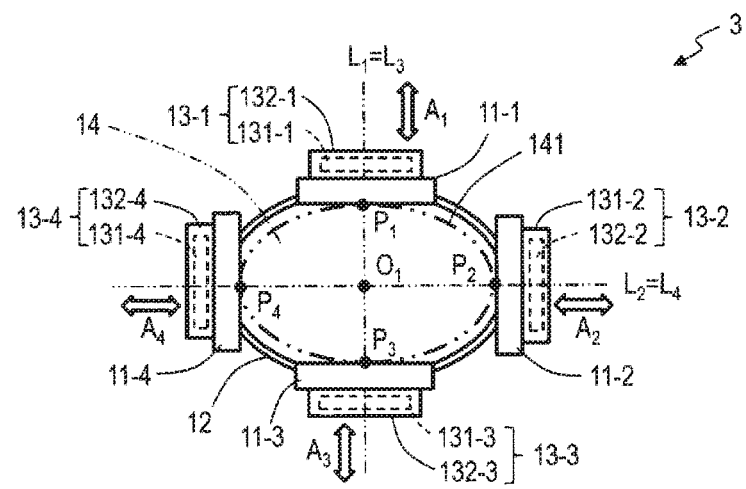

Fig. 10
Fig. 10A
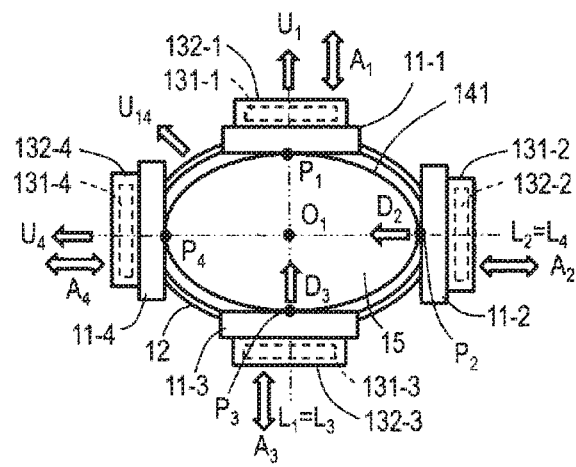
Fig. 10B
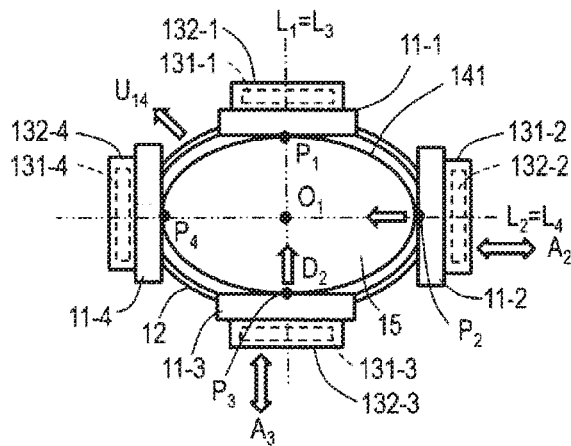
Fig. 10C
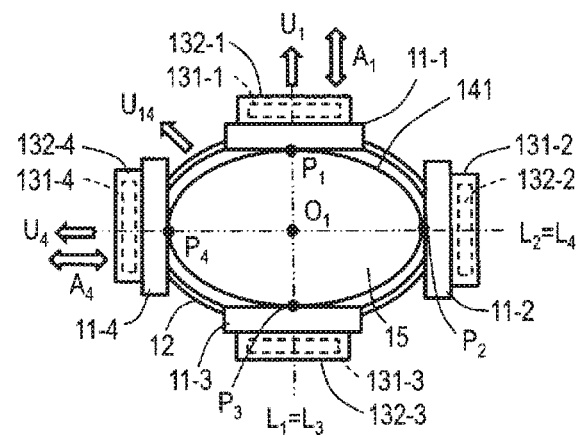

Fig. 11
Fig. 11A
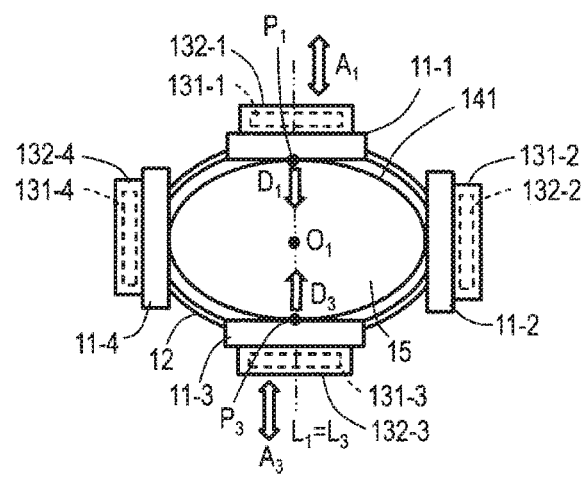
Fig. 11B
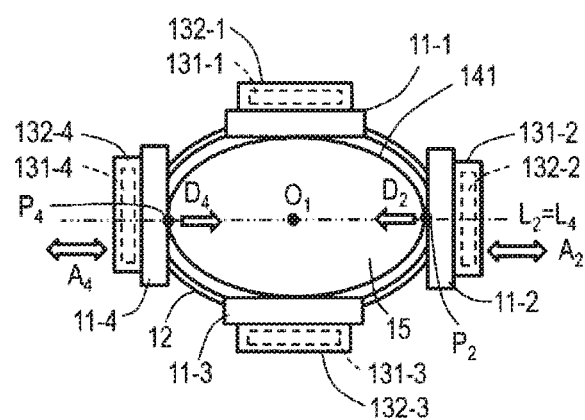

Fig. 12
Fig. 12A
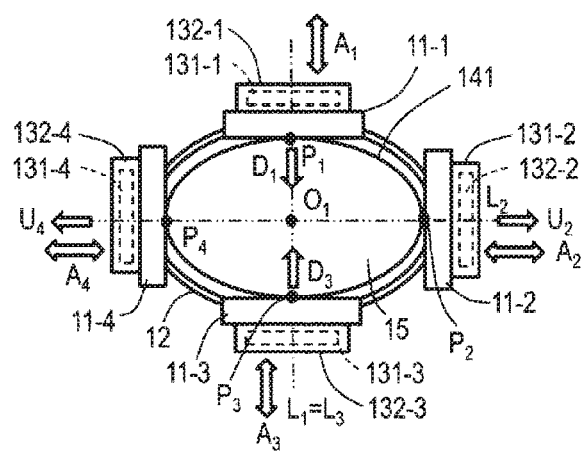
Fig. 12B
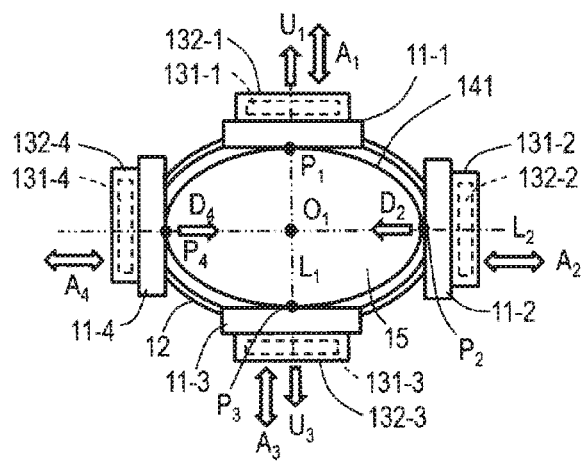

Fig. 13
Fig. 13A
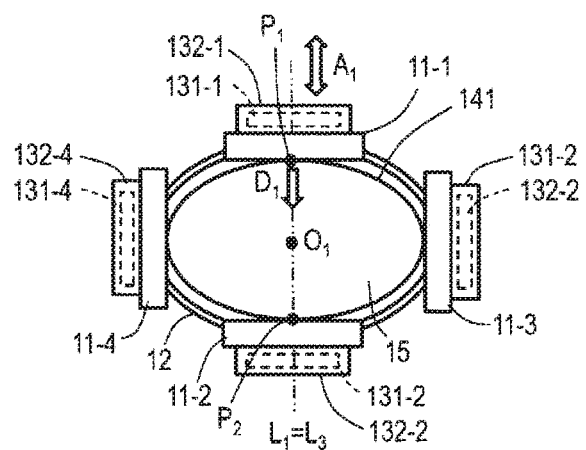
Fig. 13B
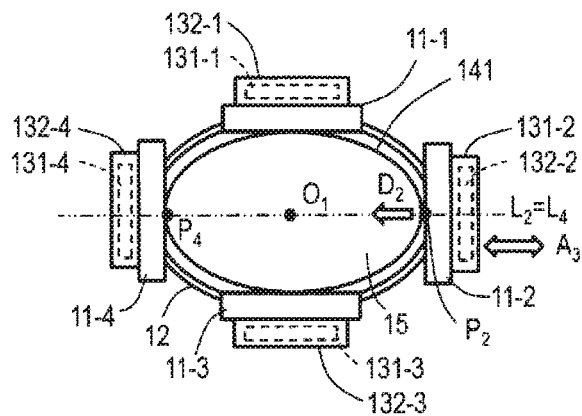

Fig. 14
Fig. 14A
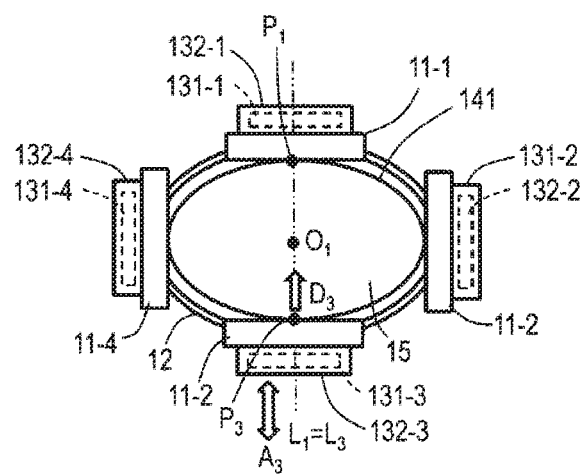
Fig. 14B
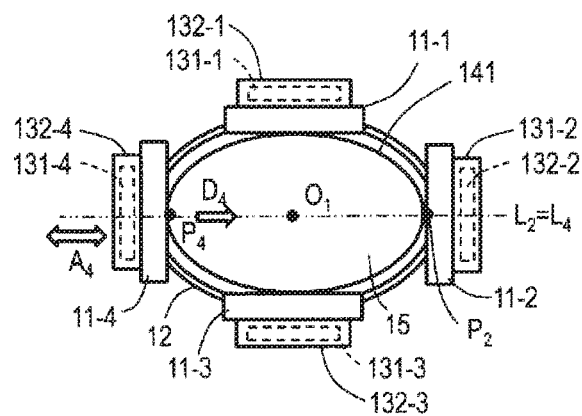

Fig. 15
Fig. 15A
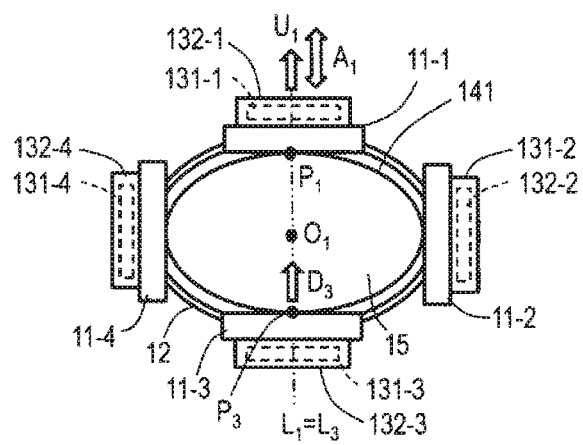
Fig. 15B
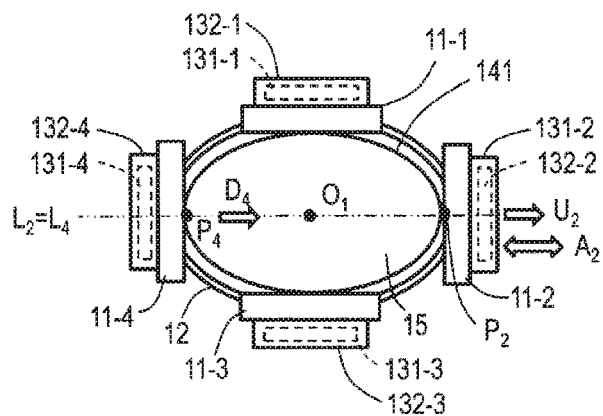

Fig. 16
Fig. 16A
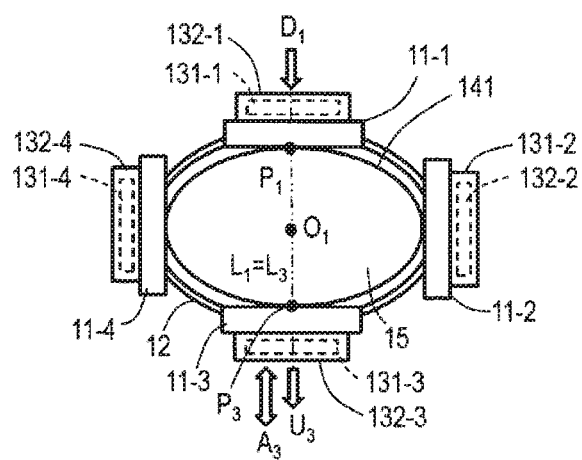
Fig. 16B
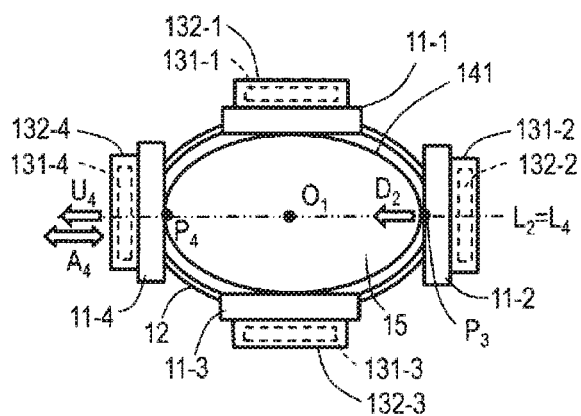

Fig. 17
Fig. 17A
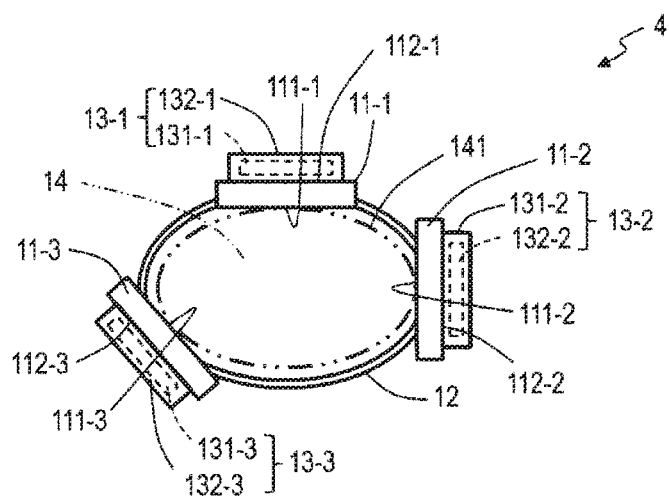
Fig. 17B
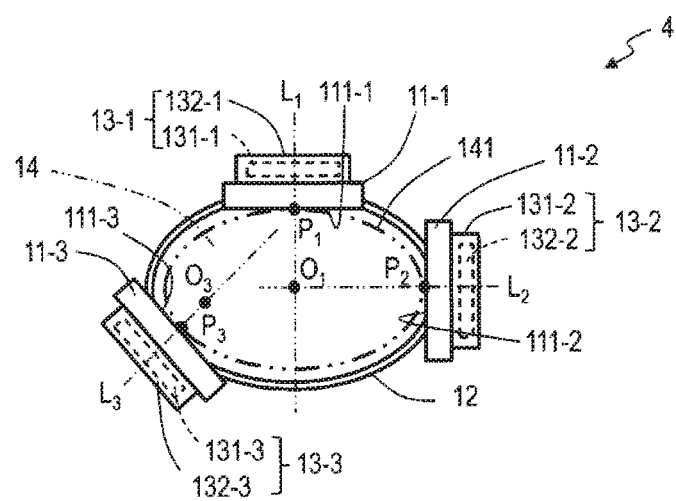

Fig. 19
Fig. 19A
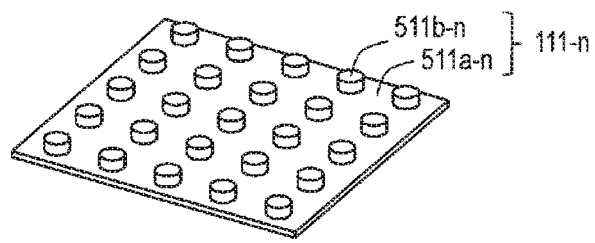
Fig. 19B
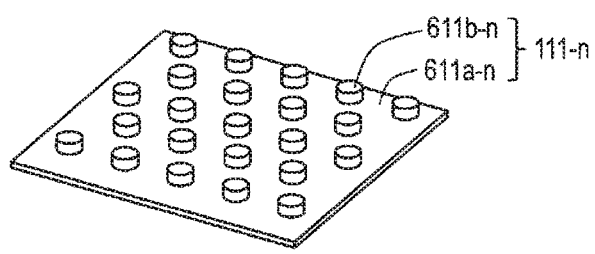
Fig. 19C
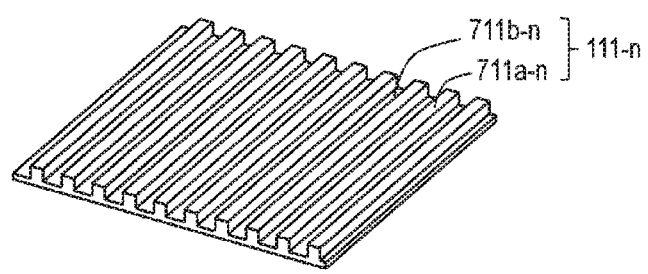
Fig. 19D
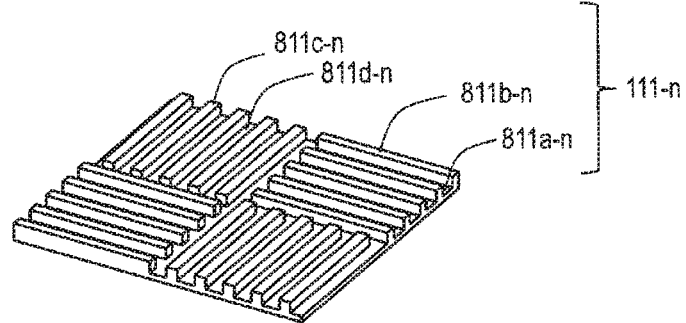

PSEUDO FORCE SENSE GENERATION APPARATUS

CROSS-REFERENCE TO RELATED APPLICATIONS

This application is a U.S. 371 Application of International Patent Application No. PCT/JP2019/004443, filed on 7 Feb. 2019, which application claims priority to and the benefit of JP Application No. 2018-021691, filed on 9 Feb. 2018, the disclosures of which are hereby incorporated herein by reference in their entireties.

TECHNICAL FIELD

The present invention relates to a technique to allow a user to perceive a pseudo-force sense.

BACKGROUND ART

When a user holds a pseudo-force sense generation apparatus that includes a vibration element which performs asymmetric vibration, this user perceives a pseudo-force sense such as a traction illusion (e.g. see PTL 1 and NPL 1).

CITATION LIST

Patent Literature

[PTL 1] WO 2017/183537

Non Patent Literature

[NPL 1] Tomohiro Amemiya, Shinya Takamuku, Sho Ito, Hiroaki Gomi, "Buru-Navi3: Apparatus to generate attraction force sensation by pinching", NTT Technical Journal, 2014, Vol. 26, No. 9, pp. 23 to 26.

SUMMARY OF THE INVENTION

Technical Problem

In the prior art, unless the user holds the apparatus, the user cannot perceive an appropriate pseudo-force sense. For example, if an apparatus, including a vibration element which performs asymmetrical vibration in the tangential direction of a surface of a physical part, is merely placed on the surface of this physical part, the force based on this asymmetric vibration is not sufficiently transferred to the physical part, and the user cannot appropriately perceive the pseudo-force sense. PTL 1 discloses a mode of mounting the apparatus, which includes the vibration element that asymmetrically vibrates in the tangential direction of the surface of the physical part, on the physical part by a band. However, even if the apparatus is mounted on the physical part by the band, the force based on the asymmetric vibration of the vibration element is not sufficiently transferred to the physical part if this asymmetric vibration direction is the tangential direction of the surface of the physical part. As a result, the user may not perceive the pseudo-force sense appropriately.

It is an object of the present invention to provide an appropriate pseudo-force sense to the user without holding the apparatus.

Means for Solving the Problem

Provided is a pseudo-force sense generation apparatus that allows to perceive a pseudo-force sense, including: a first contact member and a second contact member that are disposed along an outer peripheral surface of a mounting region, which is a three-dimensional region in which a physical part is disposed; a joining member that directly or indirectly joins the first contact member to the second contact member; and a vibration element that performs cyclic first asymmetric vibration along a line passing through a virtual point in the mounting region and the first contact member, and transfers a force in a direction along the line based on the first asymmetric vibration to the first contact member. The virtual point is disposed between the first contact member and the second contact member, and the force in the direction along the line based on the first asymmetric vibration is also transferred to the second contact member via the joining member.

Effects of the Invention

The present invention can provide an appropriate pseudo-force sense to the user without holding the apparatus.

BRIEF DESCRIPTION OF DRAWINGS

FIG. 1A is a front view of a pseudo-force sense generation apparatus of Embodiment 1, FIG. 1B is a plan view of FIG. 1A, FIG. 1C is a bottom view of FIG. 1A, and FIG. 1D is a right side view of FIG. 1A.

FIG. 2A is a front view for describing the asymmetric vibration of a vibration element of Embodiment 1, and FIG. 2B is a right side view of FIG. 2A. FIG. 2C and FIG. 2D are enlarged views for describing the asymmetric vibration of the vibration element of Embodiment 1.

FIG. 5A and FIG. 5B are diagrams for describing the operation of Embodiment 1.

FIG. 6A is a front view of a pseudo-force sense generation apparatus of Embodiment 2, FIG. 6B is a plan view of FIG. 6A, FIG. 6C is a bottom view of FIG. 6A, and FIG. 6D is a right side view of FIG. 6A.

FIG. 8A to FIG. 8C are diagrams for describing the operation of Embodiment 2.

FIG. 9A is a front view of a pseudo-force sense generation apparatus of Embodiment 3 and FIG. 9B is a front view for describing the asymmetric vibration of a vibration element of Embodiment 3.

FIG. 10A to FIG. 10C are diagrams for describing the operation of Embodiment 3.

FIG. 11A and FIG. 11B are diagrams for describing the operation of Embodiment 3.

FIG. 12A and FIG. 12B are diagrams for describing the operation of Embodiment 3.

FIG. 13A and FIG. 13B are diagrams for describing the operation of Embodiment 3.

FIG. 14A and FIG. 14B are diagrams for describing the operation of Embodiment 3.

FIG. 15A and FIG. 15B are diagrams for describing the operation of Embodiment 3.

FIG. 16A and FIG. 16B are diagrams for describing the operation of Embodiment 3.

FIG. 17A is a front view of a pseudo-force sense generation apparatus of Embodiment 4, and FIG. 17B is a front view for describing asymmetric vibration of a vibration element of Embodiment 4.

FIG. 19A to FIG. 19D are perspective views for describing a modification of a contact surface of a contact member.

DESCRIPTION OF EMBODIMENTS

Figure 3:
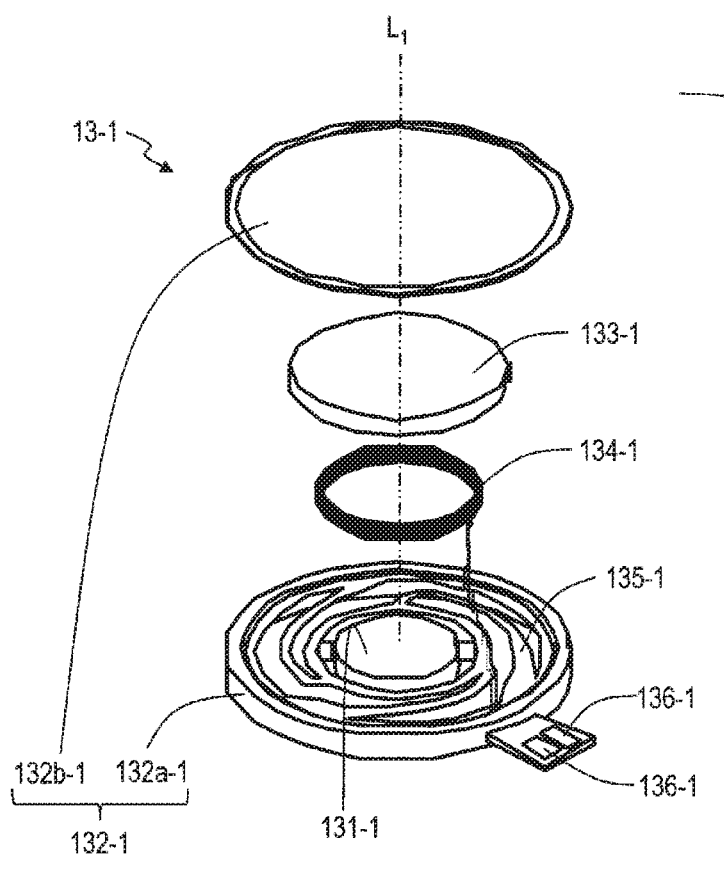
FIG. 3 is an exploded perspective view depicting an example of a vibration generation apparatus including a vibration element.

Embodiments of the present invention will be described.
[Summary]
A summary of an embodiment will be described first.

A pseudo-force sense generation apparatus of an embodiment includes: a first contact member and a second contact member that are disposed along an outer peripheral surface of a mounting region, which is a three-dimensional region in which a physical part is disposed; a joining member that directly or indirectly joins the first contact member to the second contact member; and a vibration element that performs cyclic first asymmetric vibration along a line (first line) passing through a virtual point (first virtual point) in the mounting region and the first contact member, and transfers a force in a direction along the line based on the first asymmetric vibration to the first contact member. The virtual point is disposed between the first contact member and the second contact member, and the force in the direction along the line based on the first asymmetric vibration is also transferred to the second contact member via the joining member. A user can perceive the pseudo-force sense by disposing a physical part of the user in the mounting region and the vibration element performing the first asymmetric vibration. The user simply positions the physical part in the mounting region, and need not hold the pseudo-force sense generation apparatus. The vibration element performs the cyclic first asymmetric vibration along the line passing through the virtual point in the physical part disposed in the mounting region and the first contact member, instead of the tangential direction of the outer peripheral surface of the physical part, hence the force based on the first asymmetric vibration is sufficiently transferred to the physical part, and the user can appropriately perceive the pseudo-force sense. Further, the force based on the first asymmetric vibration of one vibration element is applied to the first contact member and the second contact member, hence the pseudo-force sense can be efficiently provided to the physical part disposed there between.

The "physical part" is a part of a living body of an animal (including human). Examples of the "physical part" are a finger, palm, wrist, forearm, upper arm, foot, ankle, belly, breast, neck and head. It is preferable that the "physical part" is a part where the density of tactile receptors is high, such as the finger tips and palms. The "mounting region" is a three-dimensional space where the "physical part" can be disposed. Examples of the "physical part" are a roughly elliptic-cylindrical space region, a roughly cylindrical space region, a roughly prismatic space region, a roughly elliptic-conical space region, a roughly conical space region, and a roughly pyramidal space region. The "roughly α" refers to "exactly α" or "approximately α".

The materials of the "first contact member" and the "second contact member" may be a roughly rigid body or an elastic body as long as the materials can transfer vibration and a high friction coefficient. Examples of the roughly a rigid body are synthetic resin (e.g. ABS resin), metal, carbon fiber and plaster (for a medical cast), and an example of the elastic body is urethane rubber. The shapes of the "first contact member" and the "second contact member" are not limited, and may be a plate shape, a belt shape or such a three-dimensional shape as roughly a cube, roughly a rectangular parallelepiped and roughly a sphere. It is preferable that the "first contact member" and the "second contact member" are disposed to face each other, and the "mounting region" is disposed there between. Thereby the "physical part" disposed in the "mounting region" is sandwiched between the "first contact member" and the "second contact member", and the user can effectively perceive the pseudo-force sense. The outer peripheral side surface of the "mounting region" of the "first contact member" and/or the "second contact member" may have a shape which does not cause slippage from the "physical part" very much. For this purpose, this surface may have irregularities. For example, a plurality of grooves may be formed or a plurality of protrusions may be formed on the surface. Thereby it can be prevented that the "physical part" slips on the surface of the "first contact member" and/or the "second contact member", and the "physical part" deviates with respect to the "first contact member" and/or the "second contact member".

The "joining member" directly or indirectly joins the "first contact member" to the "second contact member". "α directly joins β to γ" refers to β and γ joined by α, and "α indirectly joins β to γ" refers to β and γ joined by α and other members. In other words, the "first contact member" and the "second contact member" may be joined to each other via the "joining member", or may be joined to each other via the "joining member" and other members (e.g. other contact members). The "joining member" may be one member or may be a set of a plurality of separate members. In other words, one member in which the "first contact member" and the "second contact member" are fixed may be the "joining member", or a set of members joining the adjacent "first contact member" and the "second contact member" to each other may be the "joining member". In the case where the "joining member" is one member, this "joining member" may be an integrally formed member, or may be a member in which a plurality of members are joined. The "joining member" is roughly a rigid body which maintains the relative distance of the "second contact member" from the "first contact member" within a predetermined range. In other words, the "joining member" is formed of a material which can maintain the relative position of the "second contact member" with respect to the "first contact member" within a predetermined range. If the "joining member" is roughly a rigid body, instead of an elastic body, the force based on the "first asymmetric vibration" can be efficiently transferred to the "second contact member". It is preferable that the "joining member" connect the "first contact member" and the "second contact member" in a loop. Thereby the force based on the "first asymmetric vibration" can be efficiently transferred to the "second contact member". The length of the "joining member" may be adjustable in accordance with the circumference of the physical part that mounts the apparatus, just like the arm band of a watch.

The "cyclic first asymmetric vibration" is a cyclic asymmetric vibration (asymmetric reciprocating motion) for the user to perceive the pseudo-force sense in the translational direction. The "pseudo-force sense" refers to a perception of sensing a force as if an object (pseudo-force sense generation apparatus) were moving (translational motion and/or rotational motion) although the object is not actually moving. Details on this asymmetric vibration are disclosed in PTL 1, NPL 1, Reference Literature 1 (Japanese Patent No. 4551448) and Reference Literature 2 (Japanese Patent Application Publication No. 2015-223563), for example. The "vibration element" performs the "cyclic first asymmetric vibration" along the "line" passing through the "virtual point" in the "mounting region" and the "first contact member". The "virtual point" may be any point as long as it is located inside the "mounting region". However the "virtual point" is disposed between the "first contact member" and the "second contact member". An example of the "virtual point" is a point located at the center of the "mounting region". An example of the "line" passing through the "virtual point" and the "first contact member" is one normal line of at least one point on the outer peripheral surface of the "mounting region". For example, the "line" that passes through the "virtual point" and the "first contact member" is a line that is roughly vertical to the tangential plane at one point on the outer peripheral surface of the "mounting region". Examples of the "one point on the outer peripheral surface of the mounting region" are one point where the "first contact member" is located, and a point on the outer peripheral surface closest to the "first contact member". For example, the "first contact member" and the "second contact member" face each other, and the "line" passing through the "vertical point" and the "first contact member" passes through the "first contact member", the "second contact member" and the "virtual point". The asymmetrical vibration along the "line" is the asymmetric vibration is a direction along this "line". The "direction along the line" is a direction that follows the "line". Examples of the "line" are the direction of the "line", and a direction that is roughly parallel with the "line".

The force (reaction force) based on the "cyclic first asymmetric vibration" of the "vibration element" is applied to a member that supports the "vibration element", and is transferred to the "first contact member". It is preferable that the "vibration element" is disposed as closely as possible to the "first contact member". For example, it is preferable that a member (e.g. a case) that supports the "vibration element" is directly fixed to the "first contact member", or the member that supports the "vibration element" is the "first contact member". In the case where the "first contact member" is fixed to the member that supports the "vibration element", the reaction force based on the "cyclic first asymmetric vibration" of the "vibration element" is applied to the member that supports the "vibration element", and is transferred to the "first contact member". On the other hand, in the case where the "vibration element" is directly supported by the "first contact member" (e.g. a case where the "first contact member" supports the "vibration element"), the reaction force based on the "cyclic first asymmetric vibration" of the "vibration element" is directly applied to the "first contact member". The force based on the "cyclic first asymmetric vibration" of the "vibration element" is a force in the direction along the "line" passing through the "virtual point" and the "first contact member". Using the force along this "line" based on the "first asymmetric vibration", the "first contact member" performs the "cyclic second asymmetric vibration" along this "line". The force in the direction along this "line" based on the "first asymmetric vibration" is also transferred to the "second contact member" via the "joining member". Thereby the "second contact member" performs the "cyclic third asymmetric vibration" along this "line". The "cyclic second asymmetric vibration" and "cyclic third asymmetric vibration" are also the asymmetric vibration for the user to perceive the pseudo-force sense in the translational direction along this "line". The "cyclic second asymmetric vibration" and the "cyclic third asymmetric vibration", which are based on the "cyclic first asymmetric vibration" of the "vibration element", synchronize with each other. When the "physical part" is disposed in the "mounting region", the force based on the "cyclic second asymmetric vibration" of the "first contact member" and the force based on the "cyclic third asymmetric vibration" of the "second contact member" are transferred to the "physical part", and the user perceives the pseudo-force sense in a direction along this "line" in the "physical part". The direction in which the user perceives the pseudo-force sense depends on the temporal change of the force based on the "cyclic first asymmetric vibration" (force based on the "cyclic second asymmetric vibration" and force based on the "cyclic third asymmetric vibration"). In other words, by making the temporal change of the force in the first direction along this "line" and the temporal change of the force in the second direction, which is the opposite direction of the first direction, to be asymmetric with each other, the pseudo-force sense can be provided in the first direction or the second direction. Here if the maximum value of the force in the first direction is larger than the maximum value of the force in the second direction, and a first time during which the force in the first direction is being generated is shorter than a second time during which the force in the second direction is being generated, for example, the user can perceive the pseudo-force sense in the first direction. Details thereof are disclosed in PTL 1, NPL 1 and in Reference Literature 1 and 2, for example. In order to transfer sufficient force based on the "cyclic first asymmetric vibration" to the "first contact member" and the "second contact member", it is preferable that the mass of the "vibration element" is not less than the total mass of the "first contact member", the "second contact member", and the "joining member". For example, it is preferable that the "vibration element" is formed of metal (e.g. iron, steel, ferrite, neodymium), and the "first contact member", the "second contact member" and the "joining member" are formed of synthetic resin (e.g. ABS resin).

A pseudo-force sense generation apparatus of another embodiment includes: a first contact member to an N-th contact member that are disposed along an outer peripheral surface of a mounting region, which is a three-dimensional region in which a physical part is disposed; a joining member that directly or indirectly joins the first contact member to the N-th contact member; and an n-th vibration element that performs cyclic n-th asymmetric vibration along an n-th line passing through an n-th virtual point in the mounting region and the n-th contact member, and transfer a force in the direction along the n-th line based on the n-th asymmetric vibration to the n-th contact member. Here n=1, . . . , N, and N is 2 or greater integer. A user can perceive the pseudo-force sense by disposing a physical part of the user in the mounting region and the n-th vibration element performing the n-th asymmetric vibration. The user simply places the physical part in the mounting region, and need not hold the pseudo-force sense generation apparatus. The n-th vibration element performs the cyclic n-th asymmetric vibration along the line passing through the n-th virtual point in the physical part disposed in the mounting region and the n-th contact member, instead of the tangential direction of the outer peripheral surface of the physical part, hence the force based on the n-th asymmetric vibration is sufficiently transferred to the physical part, and the user can appropriately perceive the pseudo-force sense. Further, the user can perceive the pseudo-force sense in various directions by controlling the combination of the n-th vibration elements to be driven and the mode of the n-th asymmetric vibration.

The material of the "n-th contact member" may be roughly a rigid body or an elastic boy, as long as the material can transfer vibration. The shape of the "n-th contact member" is not limited, and may have a plate shape, a belt shape or such a three-dimensional shape as roughly a cube, roughly a rectangular parallelepiped, and roughly a sphere. The outer periphery side surface of the "mounting region" of the "n-th contact member" may have a shape which does not cause slippage from the "physical part" very much. For example, this surface may have irregularities.

The "joining member" directly or indirectly joins the "first contact member" to the "N-th contact member". "α directly joins β to γ" refers to β to γ joined by α, and "α indirectly joins β to γ" refers to β to γ joined by α and other members. In other words, the "first contact member" to the "N-th contact member" may be joined to each other via the "joining member", or may be joined to each other via the "joining member" and other members (e.g. other contact members). The "joining member" may be one member or may be a set of a plurality of separate members. The "joining member" of this example may be roughly a rigid body or may be an elastic body. The "joining member" formed of roughly a rigid body maintains a relative distance between the "$n_1$-th contact member" and the "$n_2$-th contact member" ($n_1$, $n_2 \in \{1, \ldots, N\}$), which are adjacent to each other, within a predetermined range. If the "joining member" is roughly a rigid body, the force based on the "$n_1$-th asymmetric vibration" can be efficiently transferred to the "$n_2$-th contact member". If the "joining member" is an elastic body, on the other hand, transfer of the force based on the "$n_1$-th asymmetric vibration" to the "$n_2$-th contact member" can be suppressed.

In the case of N≥3, it is preferable that the first vibration element to the N-th vibration element are disposed at the vertexes of the N-gon, including roughly the center of the "mounting region". The "cyclic n-th asymmetric vibration" is an asymmetric vibration for the user to perceive the pseudo-force sense in the translational direction. The "n-th vibration element" performs the "cyclic n-th asymmetric vibration" along the "line" passing through the "n-th virtual point" in the "mounting region" and the "n-th contact member". The "n-th virtual point" may be any point as long as it is a point inside the "mounting region". An example of the "n-th virtual point" is a point located at the center of the "mounting region". An example of the "n-th line" passing through the "n-th virtual point" and the "n-th contact member" is a normal line at the n-th point on the outer peripheral surface of the "mounting region". For example, the "n-th line" passing through the "n-th virtual point" and the "n-th contact member" is a line that is vertical to the n-th tangential plane at the n-th point on the outer peripheral surface of the "mounting region". Examples of the "n-th point on the outer peripheral surface of the mounting region" are: a point on the outer peripheral surface where the "n-th contact member" is located; and a point on the outer peripheral surface closest to the "n-th contact member". For example, the "$n_3$-th contact member" and the "$n_4$-th contact member" face each other (where $n_3$, $n_4 \in \{1, \ldots, N\}$), and the "n-th line" passes through the "$n_3$-th contact member", the "$n_4$-th contact member" and the "$n_3$-th virtual point".

The force (reaction force) based on the "cyclic n-th asymmetric vibration" of the "n-th vibration element" is provided to a member that supports the "n-th vibration element", and is transferred to the "n-th contact member". If the "joining member" is roughly a rigid body, this force is also transferred to another contact member "$n_5$-th contact member" (where $n_5 \in \{1, \ldots, N\}$, $n_5 \neq n$). If the "joining member" is an elastic body, this force is hardly transferred to the "$n_5$-th contact member". It is preferable that the "n-th vibration element" is disposed as closely as possible to the "n-th contact member". For example, it is preferable that a member (e.g. a case) which supports the "n-th vibration element" is directly fixed to the "n-th contact member", or a member that supports the "n-th vibration element" is the "n-th contact member". In order to transfer sufficient force based on the "cyclic n-th asymmetric vibration" to the "n-th contact member", it is preferable that the mass of the "n-th vibration member" is not less than the mass of the "n-th contact member". It is preferable that the mass of the "n-th vibration element" is not less than the total of the masses of the "n-th contact member" and the "joining member". For example, it is preferable that the "n-th vibration element" is formed of metal (e.g. iron, ferrite, neodymium), and the "n-th contact member" and the "joining member" are formed of synthetic resin (e.g. ABS resin). When the "physical part" is disposed in the "mounting region", the force based on the "cyclic n-th asymmetric vibration" of the "n-th vibration element" is transferred to the "physical body", and the user perceives the pseudo-force sense. This pseudo-force sense differs depending on the mode of driving the "n-th vibration element".

For example, the "$i_1$-th vibration element" performs "$i_1$-th asymmetric vibration", for the user to perceive the pseudo-force sense in the direction from the "$i_1$-th contact member" to the "$i_1$-th virtual point", while the "$i_2$-th vibration element" performs the "$i_2$-th asymmetric vibration", for the user to perceive the pseudo-force sense in the direction from the "$i_2$-th contact member" to the "$i_2$-th virtual point", whereby the user can perceive the force sense as if the "physical part" were squeezed by the "$i_1$-th contact member" and the "$i_2$-th contact member" from both sides (force sense as if being squeezed (called the "squeezing force sense")). However in this case, the proper subset $subset_1 \subset \{1, \ldots, N\}$ and the proper subset $subset_2 \subset \{1, \ldots, N\}$ are different from each other, where $i_1 \in subset_1$, $i_2 \in subset_2$ and $i_1 \neq i_2$. Further, the "$i_1$-th contact member" and the "$i_2$-th contact member" face each other, the "$i_1$-th vertical point" and the "$i_2$-th virtual point" are disposed inside the "mounting region", and the "$i_1$-th virtual point" and the "$i_2$-th virtual point" are disposed between the "$i_1$-th contact member" and the "$i_2$-th contact member".

The "squeezing force sense" in different directions may allow the user to perceive using three or more vibration elements and contact members alternately. In this case, a "first period", when the "$i_{11}$-th vibration element" performs the "$i_{11}$-th asymmetric vibration", for the user to perceive the pseudo-force sense in the direction from the "$i_{11}$-th contact member" to the "$i_{11}$-th virtual point", while the "$i_{12}$-th vibration element" performs the "$i_{12}$-th asymmetric vibration" for the user to perceive the pseudo-force sense in the direction from the "$i_{12}$-th contact member" to the "$i_{12}$-th virtual point"; and a "second period" when the "$i_{21}$-th vibration element" performs the "$i_{21}$-th asymmetric vibration" for the user to perceive the pseudo-force sense in the direction from the "$i_{21}$-th contact member" to the "$i_{21}$-th virtual point", while the "$i_{22}$-th vibration element" performs the "$i_{22}$-th asymmetric vibration" for the user to perceive the pseudo-force sense in the direction from the "$i_{22}$-th contact member" to the "$i_{22}$-th virtual point", are repeated. In this repeat, N is 3 or greater integer (e.g. N is 4 or greater integer), and the following conditions must be satisfied. These conditions are: the proper subset $subset_1 \subset \{1, \ldots,$ N} and the proper subset subset$_2 \subset \{1, \ldots, N\}$ are different from each other; the proper subset subset$_{11} \subset$ subset$_1$ and the proper subset subset$_{12} \subset$ subset$_1$ are different from each other; the proper subset subset$_{21} \subset$ subset$_2$ and the proper subset subset$_{22} \subset$ subset$_2$ are different from each other; i$_{11} \in$subset$_{11}$; i$_{12} \in$subset$_{12}$; i$_{21} \in$subset$_{21}$; i$_{22} \in$subset$_{22}$; i$_{11} \neq$i$_{12}$; i$_{21} \neq$i$_{22}$; the "i$_{11}$-th virtual point", the "i$_{12}$-th virtual point", the "i$_{21}$-th virtual point" and the "i$_{22}$-th virtual point" are disposed inside the "mounting region"; the "i$_{11}$-th contact member" and the "i$_{12}$-th contact member" face each other; the "i$_{11}$-th virtual point" and the "i$_{12}$-th virtual point" are disposed between the "i$_{11}$-th contact member" and the "i$_{12}$-th contact member"; the "i$_{21}$-th contact member" and the "i$_{22}$-th contact member" face each other; and the "i$_{21}$-th virtual point" and the "i$_{22}$-th virtual point" are disposed between the "i$_{21}$-th contact member" and the "i$_{22}$-th contact member".

It is also possible that the "i$_1$-th vibration element" performs the "i$_1$-th asymmetric vibration" for the user to perceive the pseudo-force sense in the direction from the "i$_1$-th contact member" to the "i$_1$-th virtual point", while the "i$_2$-th vibration element" performs the "i$_2$-th asymmetric vibration" for the user to perceive the pseudo-force sense in the direction from the "i$_2$-th contact member" to the "i$_2$-th virtual point", so that the user perceives the pseudo-force sense in the direction from inside to outside the "mounting region", and/or the pseudo-force sense in the rotating direction around the rotation axis in the "mounting region". Here the proper subset subset$_1 \subset \{1, \ldots, N\}$ and the proper subset subset$_2 \subset \{1, \ldots, N\}$ are different from each other, i$_1 \in$subset$_1$, i$_2 \in$subset$_2$ and i$_1 \neq$i$_2$.

After the "i-th vibration element" starts the "i-th asymmetric vibration" for the user to perceive the pseudo-force sense in the direction from the "i-th contact member" to the "i-th virtual point", (i=1, . . . , N), "j-th vibration element" may start the "j-th asymmetric vibration" for the user to perceive the pseudo-force sense in the direction from the "j-th contact member" to the "j-th virtual point". Here the "first contact member" to the "N-th contact member" enclose the "mounting region", N is 3 or greater integer, j=(i mod N)+1, and the "i-th contact member" and the "j-th contact member" are next to each other. Thereby the user perceives the pseudo-force sense as if the surrounding of the "physical part" mounted in the "mounting region" is sequentially pressed. In this case, after the "i-th asymmetric vibration" is started, the "j-th asymmetric vibration" may be started while performing the "i-th asymmetric vibration" (i=1, . . . , N). Further, after the "j-th asymmetric vibration" is started, the "i-th asymmetric vibration" may be stopped. The "i-th asymmetric vibration" may be continued even after the "j-th asymmetric vibration" is started, or may be ended after continuing the started "i-th asymmetric vibration" for a predetermined time, or may be ended after the "first asymmetric vibration" to the "N-th asymmetric vibration" are all started. Alternately, after the "i-th vibration element" starts the "i-th asymmetric vibration" for the user to perceive the pseudo-force sense in the direction from the "i-th virtual point" to the "i-th contact member", the "j-th vibration element" may start the "j-th asymmetric vibration" for the user to perceive the pseudo-force sense in the direction from the "j-th virtual point" to the "j-th contact member". In this case as well, the force is transferred to other contact members via the "joining member", and the other contact members provide the pseudo-force sense to the "physical part". Thereby the user perceives the pseudo-force sense as if the surrounding of the "physical part" mounted in the "mounting region" were sequentially pressed.

The vibration elements which are simultaneously driven may be synchronized. In other words, when k$_1 \in \{1, \ldots, N\}$ and k$_2 \in \{1, \ldots, N\}$, the "k$_2$-th vibration element" performs the "k$_2$-th asymmetric vibration" when the "k$_1$-th vibration element" performs the "k$_1$-th asymmetric vibration", and the phase of the "k$_1$-th asymmetric vibration" and the phases of "k$_2$-th asymmetric vibration" synchronize with each other. Thereby the pseudo-force sense can be efficiently provided.

Embodiment 1

Embodiment 1 will be described.
<Configuration of Pseudo-Force Sense Generation Apparatus 1>
As illustrate in FIG. 1A to FIG. 1D and FIG. 2A to FIG. 2D, a pseudo-force sense generation apparatus 1 of Embodiment 1 includes a contact member 11-1 (first contact member), a contact member 11-2 (second contact member), a joining member 12 and a vibration generation apparatus 13-1 (first vibration generation apparatus). The vibration generation apparatus 13-1 includes a vibration element 131-1 and a support unit 132-1.
<<Content Member 11-1 and Contact Member 11-2>>
The contact member 11-1 and the contact member 11-2 of Embodiment 1 are plate members (e.g. disk-shaped members). The contact member 11-1 and the contact member 11-2 face each other, and one plate surface 111-1 of the content member 11-1 and one plate surface 111-2 of the contact member 11-2 face each other. For example, the plate surface 111-1 and the plate surface 111-2 are disposed roughly parallel with each other. The contact member 11-1 and the contact member 11-2 are disposed along the outer peripheral surface 141 of a mounting region 14, which is a three-dimensional region where a physical part is disposed. In other words, the mounting region 14 is disposed between the plate surface 111-1 and the plate surface 111-2. The mounting region 14 of Embodiment 1 is a three-dimensional space having roughly an elliptic cylinder shape. The plate surface 111-1 and the plate surface 111-2 are disposed on the tangential plane of the outer peripheral surface 141 of the mounting region 14, for example.
<<Joining member 12>>
The joining member 12 of Embodiment 1 directly joins the contact member 11-1 to the contact member 11-2. The joining member 12 of Embodiment 1 is roughly a rigid body which maintains the relative distance of the contact member 11-2 to the contact member 11-1 within a predetermined range. For example, the joining member 12 is an annular band (e.g. belt, bracelet), and the contact member 11-1 and the contact member 11-2 are fixed to the band.
<<Vibration Generation Apparatus 13-1>>
The support unit 132-1 of the vibration generation apparatus 13-1 is fixed to a plate surface 112-1 (the other side of the plate surface 111-1) of the contact member 11-1. The vibration element 131-1 of the vibration generation apparatus 13-1 performs a cyclic asymmetric vibration A$_1$ (first asymmetric vibration) to the support unit 132-1 along the line L$_1$. In other words, if the vibration generation apparatus 13-1 is driven, the relative position of the vibration element 131-1, with respect to the support unit 132-1, changes along the line L$_1$ (first line), and the vibration element 131-1 performs the cyclic asymmetric vibration A$_1$ to the support unit 132-1 along the line L$_1$. The line L$_1$ is a line passing through a virtual point O$_1$ (first virtual point) in the mounting region 14 and the contact member 11-1. For example, the line L$_1$ passes through the virtual point O$_1$ in the mounting region 14 and a point P$_1$ of the contact member 11-1. It is preferable that the line $L_1$ is a line passing through the virtual point $O_1$ in the mounting region 14, the contact member 11-1 and the contact member 11-2. For example, the line $L_1$ passes through the virtual point $O_1$ in the mounting region 14, a point $P_1$ of the contact member 11-1, and a point $P_2$ of the contact member 11-2. This example of the line $L_1$ is a normal line at one point $P_1$ on the outer peripheral surface 141 of the mounting region 14. For example, an example of the line $L_1$ is a line that is roughly vertical to the tangential plane at one point $P_1$ on the outer peripheral surface 141 of the mounting region 14. An example of the point $P_1$ is a contact point of the plate surface 111-1 of the contact member 11-1 and the outer peripheral surface 141 of the mounting region 14, and an example of the point $P_2$ is a contact point of the plate surface 111-2 of the contact member 11-2 and the outer peripheral surface 141 of the mounting region 14. The virtual point $O_1$ is disposed between the contact member 11-1 and the contact member 11-2. An example of the point $O_1$ is the center point of the mounting region 14.

The vibration generation apparatus 13-1 is an actuator, for example, and is an apparatus that converts the inputted control signals into asymmetric vibration $A_1$ of the vibration element 131-1. If the vibration element 131-1 performs the asymmetric vibration $A_1$, the vibration generation apparatus 13-1 may be a linear actuator, or may be an apparatus that causes the vibration element 131-1 to perform asymmetric vibration $A_1$ using power generated by a rotor. For example, the apparatus that generates the asymmetric vibration, disclosed in PTL 1, NPL 1 and Reference Literature 1 and 2 may be used for the vibration generation apparatus 13-1. A voice coil motor (VCM) or a piezoelectric element may be used for the vibration generation apparatus 13-1 as well. FIG. 3 is an example when the voice coil motor is used for the vibration generation apparatus 13-1. The vibration generation apparatus 13-1 illustrated in FIG. 3 includes: the vibration element 131-1; a base 132a-1 and a cover 132b-1 which constitute the support unit 132-1; a permanent magnet 133-1; a coil 134-1; a plate spring 135-1; and an electrode 136. The base 132a-1 is roughly a cylindrical hollow member, of which one end is open. An end of the plate spring 135-1 is fixed to the inside wall of the base 132a-1, and the vibration element 131-1 is fixed to the center of the plate spring 135-1. Because of the elastic force of the plate spring 135-1, the vibration element 131-1 can vibrate (reciprocating motion) in the line $L_1$ direction (direction of the central axis of the base 132a-1) with respect to the base 132a-1. The vibration element 131-1 is a yoke of an electro-magnet, and functions as a weight as well. The vibration element 131-1 of this example has roughly a cylindrical shape, and the coil 134-1 is wound on the outer peripheral side face of the vibration element 131-1 around the shaft. The coil 134-1 is a wire covered with an insulator (e.g. enamel), and both ends thereof are electrically connected to the electrodes 136-1. On one end side (cover 132b-1 side) of the vibration element 131-1, one magnetic pole side (S-pole side or N-pole side) of the permanent magnet 133-1 is disposed. In this way, the vibration element 131-1, the permanent magnet 133-1, the coil 134-1 and the plate spring 135-1 are housed inside the base 132a-1, and the open end side of the base 132a-1 is covered by the cover 132b-1, which is fixed to the base 132a-1. Here the permanent magnet 133-1 is fixed to the cover 132b-1. When a control signal (control current or control voltage) is applied to the electrode 136-1, current in accordance with the control signal flows to the coil 134-1, and a magnetic field is generated thereby. By this magnetic field, the vibration element 131-1 cyclically vibrates with the coil 134-1 in the line $L_1$ direction. By controlling this control signal, the vibration element 131-1 can perform asymmetric vibration cyclically along the line $L_1$ direction.

When the vibration element 131-1 performs the cyclic asymmetric vibration $A_1$ to the support unit 132-1 along the line $L_1$, the reaction force (force along the line $L_1$) thereof is transferred to the support unit 132-1. The force transferred to the support unit 132-1 (force along the line $L_1$) is further transferred to the contact member 11-1. By this force (force along the line $L_1$), the contact member 11-1 performs the cyclic asymmetric vibration $A_1'$ (second asymmetric vibration) along the line $L_1$. The reaction force (force along the line $L_1$) based on the cyclic asymmetric vibration $A_1$ of the vibration element 131-1 is further transferred to the contact member 11-2 via the joining member 12. Thereby the contact member 11-2 performs the cyclic asymmetric vibration $A_1''$ (third asymmetric vibration) along the line $L_1$.

<Control System>

Figure 4:
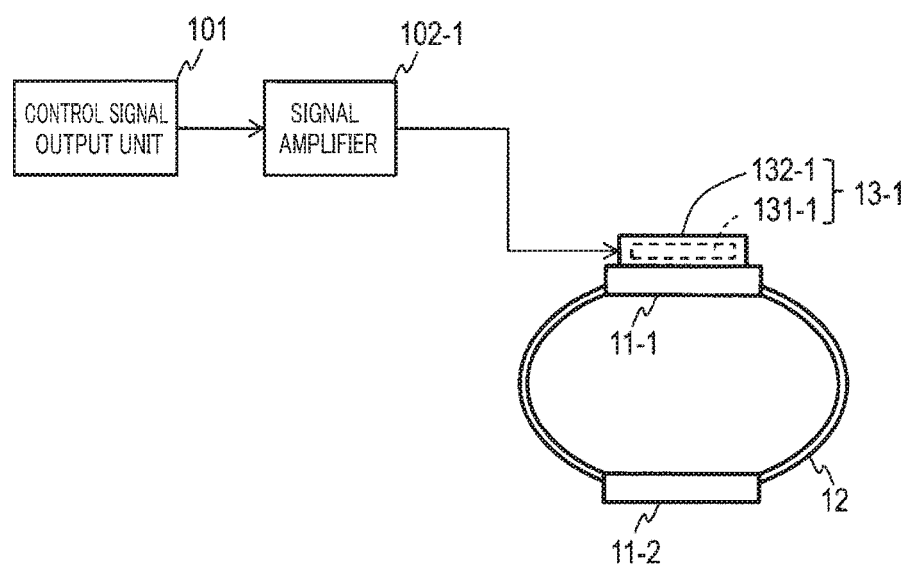
FIG. 4 is a diagram depicting an example of a control system for driving the pseudo-force sense generation apparatus of Embodiment 1.

An example of a control system to drive the pseudo-force sense generation apparatus 1 will be described. As illustrated in FIG. 4, the control system of Embodiment 1 includes: a control signal output unit 101 that generates a control signal; a signal amplifier 102-1 that amplifies the control signal outputted from the control signal output unit 101; and the pseudo-force sense generation apparatus 1 including the vibration generation apparatus 13-1 which is driven by the control signal amplified by the signal amplifier 102-1.

The control signal output unit 101 generates and outputs a control signal (control voltage or control current) for the vibration element 131-1 of the vibration generation apparatus 13-1 to perform asymmetric vibration. The control signal output unit 101 is a unit configured by a general purpose or dedicated computer, which includes a processor (hardware processor) such as a central processing unit (CPU), and memory such as a random access memory (RAM) and a read only memory (ROM), and executes a predetermined program. This computer may include one processor and one memory, or may include a plurality of processors and a plurality of memories. This program may be installed on the computer, or may be recorded to ROM or the like in advance. Further, a part or all of the processing units may be configured by circuitry that implements the processing functions without using a program, instead of circuitry that implements the functional configuration by reading the program (e.g. CPU). Circuitry constituting of one apparatus may include a plurality of CPUs. Details on the control signal are disclosed in PTL 1, NPL 1, and Reference Literature 1 and 2, for example.

The signal amplifier 102-1 amplifies the control signal, received from the control signal output unit 101, using an amplifier circuit and the like, and supplies the amplified control signal to the vibration generation apparatus 13-1. The signal amplifier 102-1 may include a function to change the amplification factor of the control signal based on a function of a digital potentiometer element or the like.

<Operation>

An operation of the pseudo-force sense generation apparatus 1 of Embodiment 1 will be described. As illustrated in FIG. 5A and FIG. 5B, the user places the physical part 15 in the mounting region 14. The outer peripheral surface of the physical part 15 may be skin or a mucous membrane, or a cloth covering the skin or mucous membrane. The outer peripheral surface 151-1 of the physical part 15 contacts the plate surface 111-1 of the contact member 11-1, and the outer peripheral surface 151-2 of the physical part 15 contacts the plate surface 111-2 of the contact member 11-2. Thereby the physical part 15 is sandwiched by the contact member 11-1 and the contact member 11-2, and the contact member 11-1 and the contact member 11-2 are fixed to the outer peripheral surface 151-1 and the outer peripheral surface 151-2 at a certain degree of pressure. If the physical part 15 is a wrist, for example, the vibration generation apparatus 13-1 is mounted to be located on the upper face side of the wrist.

When a control signal is supplied to the vibration generation apparatus 13-1 and the vibration element 131-1 of the vibration generation apparatus 13-1 performs the cyclic asymmetric vibration $A_1$ along the line $L_1$, the pseudo-force sense generation apparatus 1 can provide a pseudo-force sense (FIG. 5A) in the $U_1$ direction along the line $L_1$ from the contact member 11-2 to the physical part 15 (e.g. normal line direction of the outer peripheral surface 151-2 of the physical part 15), or can provide a pseudo-force sense (FIG. 5B) in the $U_2$ direction along the $L_1$ from the contact member 11-1 to the physical part 15 (e.g. normal line direction of the outer peripheral surface 151-1 of the physical part 15), in accordance with the asymmetric vibration $A_1$.

In the case of providing a pseudo-force sense in the $U_1$ direction, a control signal is supplied to the vibration generation apparatus 13-1 so that the maximum value of the reaction force in the $U_1$ direction based on the asymmetric vibration $A_1$ becomes larger than the maximum value of the reaction force in the $D_1$ direction, which is the opposite of the $U_1$ direction, and the time during which the reaction force in the $U_1$ direction is generated becomes shorter than the time during which the reaction force in the $D_1$ direction is generated (FIG. 2C and FIG. 2D). The force based on this asymmetric vibration $A_1$ is transferred to the contact member 11-2 via the joining member 12, and the contact member 11-2 performs the cyclic asymmetric vibration $A_1$" along the line $L_1$. Thereby the maximum value of the force in the $D_2$ direction along the line $L_1$ (direction that is roughly the same as the $U_1$ direction), which is applied from the contact member 11-2 to the outer peripheral surface 151-2 of the physical part 15, becomes larger than the maximum value of the force in the $U_2$ direction, which is the opposite of the $D_2$ direction, and the time during which the force in the $D_2$ direction is generated becomes shorter than the time during which the force in the $U_2$ direction is generated. As a result, the user perceives in the physical part 15 the pseudo-force sense in the $U_1$ direction (FIG. 5A).

In the case of providing the pseudo-force sense in the $U_2$ direction, on the other hand, a control signal is supplied to the vibration generation apparatus 13-1, so that the maximum value of the reaction force in the $D_1$ direction, based on the asymmetric vibration $A_1$, becomes larger than the maximum value of the reaction force in the $U_1$ direction, which is the opposite of the $D_1$ direction, and the time during which the reaction force in the $D_1$ direction is generated becomes shorter than the time during which the reaction force in the $U_1$ direction is generated (FIG. 2C and FIG. 2D). The force based on this asymmetric vibration $A_1$ is transferred to the contact member 11-1, and the contact member 11-1 performs the cyclic asymmetric vibration $A_1'$ along the line $L_1$. Thereby the maximum value of the force in the $D_1$ direction along the line $L_1$ (direction that is roughly the same as the $U_2$ direction), which is applied from the contact member 11-1 to the outer peripheral surface 151-1 of the physical part 15, becomes larger than the maximum value of the force in the $U_1$ direction, which is the opposite of the $D_1$ direction, and the time during which the force in the $D_1$ direction is generated becomes shorter than the time during which the force in the $U_1$ direction is generated. As a result, the user perceives in the physical part 15 the pseudo-force sense in the $U_2$ direction (FIG. 5B).

<Characteristics of Embodiment 1>

The user can merely mount the physical part 15 in the mounting region 14, and need not hold the pseudo-force sense generation apparatus 1. Further, the vibration element 131-1 performs the cyclic asymmetric vibration $A_1$, not in the tangential direction of the outer peripheral surface of the physical part 15, but along the line $L_1$ (e.g. normal line of the outer peripheral surface 151-1 of the physical part 15) passing through the virtual point $O_1$ in the physical part 15 disposed in the mounting region 14 and the contact member 11-1. Therefore the force based on the asymmetric vibration $A_1$ is sufficiently transferred to the physical part 15, and the user can perceive the pseudo-force sense appropriately. Furthermore, the contact member 11-1 and the contact member 11-2 are connected with each other, and the force based on the asymmetric vibration $A_1$ of one vibration element 131-1 is applied to the contact member 11-1 and the contact member 11-2, so that all members perform the asymmetric vibration together. Thereby the pseudo-force sense can be efficiently provided to the physical part 15 which is disposed among these members. In other words, in the case of providing the pseudo-force sense in the $U_1$ direction from the contact member 11-2 to the physical part 15 (direction in which the vibration element 131-1 departs from the physical part 15), the physical part 15 is stimulated by the contact member 11-2 (FIG. 5A), hence the force sense can be efficiently provided to the physical part 15.

Embodiment 2

Embodiment 2 will be described. In the following, differences from the already described matters will be mainly described, and description on the matters common to the already described matters will be simplified.

As illustrated in FIG. 6A to FIG. 6D, a pseudo-force sense generation apparatus 2 of Embodiment 2 includes: N number of contact members 11-1, . . . , 11-N (first contact member, . . . , N-th contact member); a joining member 12; and N number of vibration generation apparatuses 31-1, . . . , 31-N (first vibration generation apparatus, . . . , N-th vibration generation apparatus). The vibration generation apparatus 13-$n$ includes a vibration element 131-$n$ and a support unit 132-$n$. Here n=1, . . . , N, and N is 2 or greater integer. In Embodiment 2, an example when N=2 will be described.

<<Contact Members 11-1, 11-2, Joining Member 12, Vibration Generation Apparatus 13-1>>

Description of these components, which is the same as Embodiment 1, will be omitted.

<<Vibration Generation Apparatus 13-2>>

A support unit 132-2 of the vibration generation apparatus 13-2 is fixed to the other plate surface 112-2 (the opposite side of the plate surface 111-2) of the contact member 11-2. The vibration element 131-2 of the vibration generation apparatus 13-2 performs the cyclic asymmetric vibration $A_2$ (second asymmetric vibration) to the support unit 132-2 along the line $L_1=L_2$ (second line). In other words, when the vibration generation apparatus 13-2 is driven, the relative position of the vibration element 131-2, with respect to the support unit 132-2, changes along the line $L_1$, and the vibration element 131-2 performs the cyclic asymmetric vibration $A_2$ to the support unit 132-2 along the line $L_1$. The line $L_1$ is a line passing through a virtual point $O_1=O_2$ (second virtual point) in the mounting region 14 and the contact member 11-2. For example, the line $L_1$ passes through the virtual point $O_1$ in the mounting region 14 and the point $P_2$ of the contact member 11-2. It is preferable that the line $L_1$ is a line passing through the virtual point $O_1$ in the mounting region 14, the contact member 11-1 and the contact member 11-2. For example, the line $L_1$ passes through the virtual point $O_1$ in the mounting region 14, the point $P_1$ of the contact member 11-1 and the point $P_2$ of the contact member 11-2. This example of the line $L_1$ is a normal line at one point $P_2$ on the outer peripheral surface 141 of the mounting region 14. The virtual point $O_1$ is disposed between the contact member 11-1 and the contact member 11-2. An example of the point $O_1$ is the center point of the mounting region 14. In Embodiment 2, both the first line and the second line are the line $L_1$, but the first line and the second line may be different lines. In the same manner, in Embodiment 2, both the first virtual point and the second virtual point are the virtual point $O_1$, but the first virtual point and the second virtual point may be different virtual points. A concrete configuration of the vibration generation apparatus 13-2 is the same as the vibration generation apparatus 13-1, for example.

When the vibration element 131-1 performs the cyclic asymmetric vibration $A_1$ to the support unit 132-1 along the line $L_1$, the reaction force (force along the line $L_1$) thereof is transferred to the support unit 132-1. The force transferred to the support unit 132-1 (force along the line $L_1$) is further transferred to the contact member 11-1. By this force (force along the line $L_1$), the contact member 11-1 performs the cyclic asymmetric vibration $A_1'$ along the line $L_1$. In the same manner, when the vibration element 131-2 performs the cyclic asymmetric vibration $A_2$ to the support unit 132-2 along the line $L_1$, the reaction force (force along the line $L_1$) thereof is transferred to the support unit 132-2. The force transferred to the support unit 132-2 (force along the line $L_1$) is further transferred to the contact member 11-2. By this force (force along the line $L_1$), the contact member 11-2 performs the cyclic asymmetric vibration $A_2'$ along the line $L_1$. The reaction force of the asymmetric vibration $A_1$ of the vibration element 131-1 is further transferred to the contact member 11-2 via the joining member 12, and the reaction force of the asymmetric vibration $A_2$ of the vibration element 131-2 is further transferred to the contact member 11-1 via the joining member 12.

<Control System>

Figure 7:
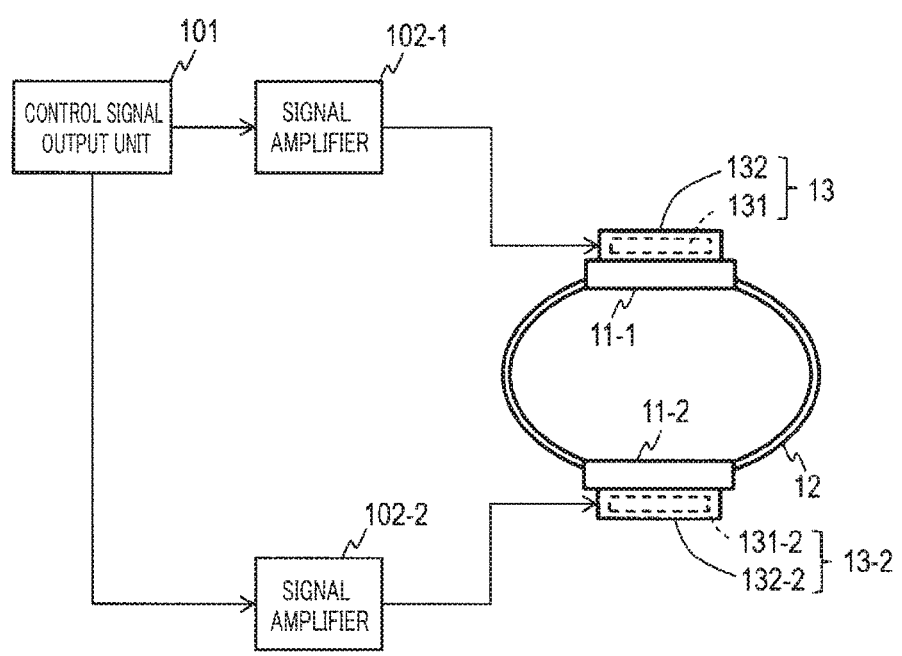
FIG. 7 is a diagram depicting an example of functional configuration to drive the pseudo-force sense generation apparatus of Embodiment 2.

An example of a control system to drive the pseudo-force sense generation apparatus 2 will be described. As illustrated in FIG. 7, the control system of Embodiment 2 includes: a control signal output unit 101 that generates a control signal; signal amplifiers 102-1 and 102-2 which amplify the control signal outputted from the control signal output unit 101; and the pseudo-force sense generation apparatus 2 including the vibration generation apparatus 13-1 which is driven by the control signal amplified by the signal amplifier 102-1, and the vibration generation apparatus 13-2 which is driven by the control signal amplified by the signal amplifier 102-2.

The control signal output unit 101 generates and outputs a control signal for the vibration element 131-$n$ of the vibration generation apparatus 13-$n$ to perform the asymmetric vibration. It is preferable that the control signal output unit 101 generates and outputs a control signal by which the phase of the asymmetric vibration $A_1$ and the phase of the asymmetric vibration $A_2$ synchronize with each other.

The signal amplifier 102-1 amplifies the control signal received from the control signal output unit 101 and supplies the amplified control signal to the vibration generation apparatus 13-1, and the signal amplifier 102-2 amplifies the control signal received from the control signal output unit 101 and supplies the amplified control signal to the vibration generation apparatus 13-2. The signal amplifiers 102-1 and 102-2 may include a function to change the amplification factor of the control signal based on the function of a digital potentiometer element or the like.

<Operation>

An operation of the pseudo-force sense generation apparatus 2 of Embodiment 2 will be described with reference to FIG. 8A to FIG. 8C. As described in Embodiment 1, the user places the physical part 15 in the mounting region 14. When the control signal is supplied to the vibration generation apparatus 13-$n$ (n=1, 2), and the vibration element 131-$n$ of the vibration generation apparatus 13-$n$ performs the cyclic asymmetric vibration $A_n$ along the line $L_1$, pseudo-force senses according to the following three aspects are provided in accordance with the asymmetric vibration $A_n$. The first aspect is a pseudo-force sense (FIG. 8A) in the $U_1$ direction along the line $L_1$ from the contact member 11-2 to the physical part 15 (e.g. normal line direction of the outer peripheral surface 151-2 of the physical part 15). The second aspect is the pseudo-force sense (FIG. 8B) in the $U_2$ direction along the line $L_1$ from the contact member 11-1 to the physical part 15 (e.g. normal line direction of the outer peripheral surface 151-1 of the physical part 15). The third aspect is the pseudo-force sense (FIG. 8C) of the physical part 15 being squeezed from (caught) the $D_1$ direction along the line $L_1$ from the contact member 11-1 to the physical part 15 (e.g. normal line direction of the outer peripheral surface 151-2 of the physical part 15); and the $D_2$ direction along the line $L_1$ from the contact member 11-2 to the physical part 15 (e.g. normal line direction of the outer peripheral surface 151-1 of the physical part 15).

In the case of providing the pseudo-force sense in the $U_1$ direction, a control signal is supplied to the vibration generation apparatus 13-2 so that the maximum value of the reaction force in the $D_2$ direction based on the asymmetric vibration $A_2$ becomes longer than the maximum value of the reaction force in the $U_2$ direction, which is the opposite of the $D_2$ direction, and the time during which the reaction force in the $D_2$ direction is generated becomes shorter than the time during which the reaction force in the $U_2$ direction is generated. The force based on this asymmetric vibration $A_2$ is transferred to the contact member 11-2, and the contact member 11-2 performs the cyclic asymmetric vibration $A_2'$ along the line $L_1$. Thereby the maximum value of the force in the $D_2$ direction along the $L_1$ (direction that is roughly the same as the $U_1$ direction), which is applied from the contact member 11-2 to the outer peripheral surface 151-2 of the physical part 15, becomes larger than the maximum value of the force in the $U_2$ direction, which is the opposite of the $D_2$ direction, and the time during which the force in the $D_2$ direction is generated becomes shorter than the time during which the force in the $U_2$ direction is generated. As a result, the user perceives in the physical part 15 the pseudo-force sense in the $U_1$ direction. Additionally, a control signal may be supplied to the vibration generation apparatus 13-1, so that the maximum value of the reaction force in the $U_1$ direction based on the asymmetric vibration $A_1$ becomes larger than the maximum value of the reaction force in the $D_1$ direction, which is the opposite of the $U_1$ direction, and the time during which the reaction force in the $U_1$ direction is generated becomes shorter than the time during which the reaction force in the $D_1$ direction is generated. This force based on the asymmetric vibration $A_1$ is transferred to the contact member 11-2 via the joining member 12, and the contact member 11-2 performs the cyclic symmetric vibration $A_1''$ along the line $L_1$. Thereby the maximum value of the force in the $D_2$ direction along the line $L_1$ (direction that is roughly the same as the $U_1$ direction), which is applied from the contact member 11-2 to the outer peripheral surface 151-2 of the physical part 15, becomes larger than the maximum value of the force in the $U_2$ direction, which is the opposite of the $D_2$ direction, and the time during which the force in the $D_2$ direction is generated becomes shorter than the time during which the force in the $U_2$ direction is generated. As a result, the user more clearly perceives in the physical part 15 the pseudo-force sense in the $U_1$ direction. If the phase of the asymmetric vibration $A_1$ is synchronized with the phase of the asymmetric vibration $A_2$, an even clearer pseudo-force sense can be provided (FIG. 8A).

In the case of providing the pseudo-force sense in the $U_2$ direction, a control signal is supplied to the vibration generation apparatus 13-1, so that the maximum value of the reaction force in the $D_1$ direction based on the asymmetric vibration $A_1$ becomes larger than the maximum value of the reaction force in the $U_1$ direction, which is the opposite of the $D_1$ direction, and the time during which the reaction force in the $D_1$ direction is generated becomes shorter than the time during which the reaction force in the $U_1$ direction is generated. The force based on this asymmetric vibration $A_1$ is transferred to the contact member 11-1, and the contact member 11-1 performs the cyclic asymmetric vibration $A_1'$ along the line $L_1$. Thereby the maximum value of the force in the $D_1$ direction along the line $L_1$ (direction that is roughly the same as the $U_2$ direction), which is applied from the contact member 11-1 to the outer peripheral surface 151-1 of the physical part 15, becomes larger than the maximum value of the force in the $U_1$ direction, which is opposite of the $D_1$ direction, and the time during which the force in the $D_1$ direction is generated becomes shorter than the time during which the force in the $U_1$ direction is generated. As a result, the user perceives in the physical part 15 the pseudo-force sense in the $U_2$ direction. Further, a control signal may be supplied to the vibration generation apparatus 13-1, so that the maximum value of the reaction force in the $U_2$ direction based on the asymmetric vibration $A_2$ becomes larger than the maximum value of the reaction force in the $D_2$ direction, which is the opposite of the $U_2$ direction, and the time during which the reaction force in the $U_2$ direction is generated becomes shorter than the time during which the reaction force in the $D_2$ direction is generated. The force based on this asymmetric vibration $A_2$ is transferred to the contact member 11-1 via the joining member 12, and the contact member 11-1 performs the cyclic asymmetric vibration $A_2''$ along the line $L_1$. Thereby the maximum value of the force in the $D_1$ direction along the line $L_1$ (direction that is roughly the same as the $U_2$ direction), which is applied from the contact member 11-1 to the outer peripheral surface 151-1 of the physical part 15, becomes larger than the maximum value of the force in the $U_1$ direction, which is the opposite of the $D_1$ direction, and the time during which the force in the $D_1$ direction is generated becomes shorter than the time during which the force in the $U_1$ direction is generated. As a result, the user more clearly perceives in the physical part 15 the pseudo-force sense in the $U_2$ direction more clearly. If the phase of the asymmetric vibration $A_1$ is synchronized with the phase of the asymmetric vibration $A_2$, an even clearer pseudo-force sense can be provided (FIG. 8B).

In the case of providing the pseudo-force sense of squeezing the physical part 15 from the $D_1$ direction and the $D_2$ direction, a control signal is supplied to the vibration generation apparatus 13-1, so that the maximum value of the reaction force in the $D_1$ direction based on the asymmetric vibration $A_1$ becomes larger than the maximum value of the reaction force in the $U_1$ direction, which is the opposite of the $D_1$ direction, and the time during which the reaction force in the $D_1$ direction is generated becomes shorter than the time during which the reaction force in the $U_1$ direction is generated. Further, a control signal is supplied to the vibration generation apparatus 13-2, so that the maximum value of the reaction force in the $D_2$ direction based on the asymmetric vibration $A_2$ becomes larger than the maximum value of the reaction force in the $U_2$ direction, which is the opposite of the $D_2$ direction, and the time during which the reaction force in the $D_2$ direction is generated becomes shorter than the time during which the reaction force in the $U_2$ direction is generated. If the phase of the asymmetric vibration $A_1$ is synchronized with the phase of the asymmetric vibration $A_2$, an even clearer pseudo-force sense can be provided (FIG. 8C).

<Characteristics of Embodiment 2>

The user can merely mount the physical part 15 in the mounting region 14, and need not hold the pseudo-force sense generation apparatus 2. Further, the vibration element 131-$n$ performs the cyclic asymmetric vibration $A_n$, not in the tangential direction of the outer peripheral surface of the physical part 15, but along the line $L_1$ (e.g. normal line of the outer peripheral surface 151-$n$ of the physical part 15) which passes through the virtual point $O_1$ in the physical part 15 disposed in the mounting region 14 and the contact member 11-$n$. Therefore the force based on the asymmetric vibration $A_n$ is sufficiently transferred to the physical part 15, and the user can perceive the pseudo-force sense appropriately. Further, various pseudo-force senses can be provided by controlling the vibration elements 131-1 and 131-2. Particularly a pseudo-force sense of squeezing the physical part 15 can be provided by the vibration element 132-2 ($i_2$-th vibration element) performing the asymmetric vibration $A_2$ ($i_2$-th asymmetric vibration) for the user to perceive the pseudo-force sense in the direction from the contact member 11-2 ($i_2$-th contact member) to the virtual point $O_1$ ($i_2$-th virtual point) (FIG. 8C). Here: the proper subset subset$_1 \subset \{1, 2\}$ and the proper subset subset$_2 \subset \{1, 2\}$ are different from each other; $i_1 \in$ subset$_1$; $i_2 \in$ subset$_2$; $i_1 \neq i_2$; the contact member 11 ($i_1$-th contact member) and the contact member 11-2 ($i_2$-th contact member) face each other; and the virtual point $O_1$ ($i_1$-th virtual point and $i_2$-th virtual point) are disposed between the contact member 11-1 ($i_1$-th contact member) and the contact member 11-2 ($i_2$-th contact member). If the phases of the asymmetric vibration of the vibration elements 131-1 and 131-2 are synchronized, an even clearer pseudo-force sense can be provided.

Embodiment 3

Embodiment 3 will be described. Embodiment 3 is a modification of Embodiment 2, and is an example when N=4. As illustrated in FIG. 9A and FIG. 9B, a pseudo-force sense generation apparatus 3 of Embodiment 3 includes: N number of contact members 11-1, ..., 11-N (first contact member, ..., N-th contact member); a joining member 12; and N number of vibration generation apparatuses 31-1, ..., 31-N (first vibration generation apparatus, ..., N-th vibration generation apparatus). The vibration generation apparatus 13-$n$ includes the vibration element 131-$n$ and the support unit 132-$n$. Here $n=1, ..., N$, and $N=4$.

<<Contact Member 11-$n$>>

The contact member 11-$n$ of Embodiment 3 is a plate member. The contact member 11-1 and the contact member 11-3 face each other, and one plate surface 111-1 of the contact member 11-1 and one plate surface 111-3 of the contact member 11-3 face each other. The contact member 11-2 and the contact member 11-4 face each other, and one plate surface 111-2 of the contact member 11-2 and the one plate surface 111-4 of the contact member 11-4 face each other. For example, the plate surface 111-1 and the plate surface 111-3 are disposed roughly parallel with each other, the plate surface 111-2 and the plate surface 111-4 are disposed roughly parallel with each other. The contact member 11-1 to the contact member 11-4 are disposed along the outer peripheral surface 141 of the mounting region 14. In other words, the mounting region 14 is surround by the contact member 11-1 to the contact member 11-4. The plate surface 111-$n$ is disposed on the tangential plane of the outer peripheral surface 141 of the mounting region 14, for example.

<<Joining Member 12>>

The joining member 12 of Embodiment 3 directly joins the contact member 11-1 to the contact member 11-4. The rest is the same as Embodiment 1.

<<Vibration Generation Apparatus 13-$n$>>

A support unit 132-$n$ of the vibration generation apparatus 13-$n$ is fixed to the other plate surface 112-$n$ {opposite side of the plate surface 111-$n$) of the contact member 11-$n$. The vibration element 131-$n$ of the vibration generation apparatus 13-$n$ performs a cyclic asymmetric vibration $A_n$ to the support unit 132-$n$ along the line $L_n$. The line $L_n$ is a line passing through the virtual point $O_1$ (n-th virtual point) in the mounting region 14 and the contact member 11-$n$. In Embodiment 3, the n-th virtual points $O_n$ are all $O_1$, but the n-th virtual points may be the same or different from each other. The line $L_n$ passes through the virtual point $O_1$ (n-th virtual point) in the mounting region 14 and a point $P_n$ of the contact member 11-$n$. It is preferable that the line $L_n$ is a line passing through the virtual point $O_1$ in the mounting region 14, the contact member 11-$n$ and the contact member 11-$m$. Here m=1+{(n mod 4)+1} mod 4. In Embodiment 3, $L_n$ and $L_m$ are $L_n=L_m$, but may be $L_n \neq L_m$. An example of such line $L_n$ is a normal line at one point $P_n$ on the outer peripheral surface 141 of the mounting region 14. For example, the line $L_n$ is a line that is roughly vertical to the tangential plane at one point $P_n$ on the outer peripheral surface 141 of the mounting region 14. An example of the point $P_n$ is a contact point between the plate surface 111-$n$ of the contact member 11-$n$ and the outer peripheral surface 141 of the mounting region 14. An example of the point $O_1$ is a center point of the mounting region 14. It is preferable that each vibration generation apparatus 13-$n$ is disposed at a vertex portion of the N-gon, including roughly the center of the mounting region 14.

When the vibration element 131-$n$ performs the cyclic asymmetric vibration $A_n$ to the support unit 132-$n$ along the line $L_n$, the reaction force (force along the line $L_n$) thereof is transferred to the support unit 132-$n$. The force transferred to the support unit 132-$n$ (force along the line $L_n$) is further transferred to the contact member 11-$n$. By this force, the contact member 11-$n$ performs the cyclic asymmetric vibration $A_n'$ along the line Ln. The reaction force of the asymmetric vibration $A_n$ of the vibration element 131-$n$ is also transferred to other contact elements 11-$n_5$ via the joining member 12 (here $n_5 \in \{1, \ldots, N\}$, $n_5 \neq n$).

<Control System>

The control system of Embodiment 3 includes: a control signal output unit 101 that generates a control signal; signal amplifiers 102-$n$ (n=1, . . . , N) which amplify the control signal outputted from the control signal output unit 101; and the pseudo-force sense generation apparatus 3 including the vibration generation apparatus 13-$n$, which is driven by the control signal amplified by the signal amplifier 102-$n$.

<Operation>

An operation of the pseudo-force sense generation apparatus 3 of Embodiment 3 will be described with reference to FIG. 10A to FIG. 16B. As described in Embodiment 1, the user places the physical part 15 in the mounting region 14. When the control signal is supplied to the vibration generation apparatus 13-$n$ (n=1, . . . , 4), and the vibration element 131-$n$ of the vibration generation apparatus 13-$n$ performs the cyclic asymmetric vibration $A_n$ along the line $L_n$, various pseudo-force senses according to the asymmetric vibration $A_n$ can be provided.

As illustrated in FIG. 10A, the pseudo-force sense generation apparatus 3 may be operated such that the vibration element 131-1 performs the asymmetric vibration $A_1$ for the user to perceive the pseudo-force sense in the $U_1$ direction, the vibration element 131-2 performs the asymmetric vibration $A_2$ for the user to perceive the pseudo-force sense in the $D_2$ direction, the vibration element 131-3 performs the asymmetric vibration $A_3$ for the user to perceive the pseudo-force sense in the $D_3$ direction, and the vibration element 131-4 performs the asymmetric vibration $A_4$ for the user to perceive the pseudo-force sense in the $U_4$ direction. Here the "asymmetric vibration $A_n$ for the user to perceive the pseudo-force sense in the $U_n$ direction" is the asymmetric vibration $A_1$ for the user to perceive the pseudo-force sense in the $U_n$ direction along the line $L_n$ from the virtual point $O_n$ to the contact member 11-$n$. The "asymmetric vibration $A_n$ for the user to perceive the pseudo-force sense in the $D_n$ direction" is the asymmetric vibration $A_n$ for the user to perceive the pseudo-force sense in the $D_n$ direction along the line $L_n$ from the contact member 11-$n$ to the virtual point $O_n$. These asymmetric vibrations $A_1$ to $A_4$ are simultaneously performed. Thereby the user perceives the pseudo-force sense in the $U_{14}$ direction, which is a direction between the $U_1$ direction and the $U_4$ direction. If the phases of the asymmetric vibrations $A_1$ to $A_4$ are synchronized, the user can perceive an even clearer pseudo-force sense.

As illustrated in FIG. 10B, the vibration element 131-2 may perform the asymmetric vibration $A_2$ for the user to perceive the pseudo-force sense in the $D_2$ direction, while the vibration element 131-3 performs the asymmetric vibration $A_3$ for the user to perceive the pseudo-force sense in the $D_3$ direction. As illustrated in FIG. 10C, the pseudo-force sense generation apparatus 3 may be operated such that the vibration element 131-1 performs the asymmetric vibration $A_1$ for the user to perceive the pseudo-force sense in the $U_1$ direction, while the vibration element 131-4 performs the asymmetric vibration $A_4$ for the user to perceive the pseudo-force sense in the $U_4$ direction. In these cases as well, the user perceives the pseudo-force sense in the $U_{14}$ direction, which is a direction between the $U_1$ direction and the $U_4$ direction. In these examples as well, if the phases of the asymmetric vibrations are synchronized, the user can perceive an even clearer pseudo-force sense.

As illustrated in FIG. 11A, the vibration element 131-1 may perform the asymmetric vibration $A_1$ for the user to perceive the pseudo-force sense in the $D_1$ direction, while the vibration element 131-3 perform the asymmetric vibration $A_3$ for the user to perceive the pseudo-force sense in the $D_3$ direction along the line $L_3$ from the contact member 11-3 to the virtual point $O_1$ (first squeezing operation). Thereby the user perceives the pseudo-force sense as if the physical part 15 were being squeezed from the contact member 11-1 and the contact member 11-3. As illustrated in FIG. 11B, the vibration element 131-2 may perform the asymmetric vibration $A_2$ for the user to perceive the pseudo-force sense in the $D_2$ direction, while the vibration element 131-4 performs the asymmetric vibration $A_4$ for the user to perceive the pseudo-force sense in the $D_4$ direction (second squeezing operation). Thereby the user perceives the pseudo-force sense as if the physical part 15 were being squeezed from the contact member 11-2 and the contact member 11-4. If the joining member 12 is formed of roughly a rigid body which has slight flexibility, an operation of continuing the first squeezing operation (FIG. 11A) for time $T_1$ and an operation of continuing the second squeezing operation (FIG. 11B) for time $T_2$ may be alternately repeated. $T_1$ and $T_2$ may be $T_1=T_2$, or $T_1 \neq T_2$. Thereby the user perceives the pseudo-force sense as if the physical part 15 were being squeezed from the contact members 11-1, 11-2, 11-3 and 11-4. In these examples too, if the phases of the asymmetric vibrations are synchronized, the user can perceive an even clearer pseudo-force sense.

As illustrated in FIG. 12A, the pseudo-force sense generation apparatus 3 may be operated such that the vibration element 131-1 performs the asymmetric vibration $A_1$ for the user to perceive the pseudo-force sense in the $D_1$ direction, the vibration element 131-2 performs the asymmetric vibration $A_2$ for the user to perceive the pseudo-force sense in the $U_2$ direction, the vibration element 131-3 performs the asymmetric vibration $A_3$ for the user to perceive the pseudo-force sense in the $D_3$ direction, and the vibration element 131-4 performs the asymmetric vibration $A_4$ for the user to perceive the pseudo-force sense in the $U_4$ direction (third squeezing operation). These asymmetric vibrations $A_1$ to $A_4$ are simultaneously performed. Thereby the user more clearly perceives the pseudo-force sense as if the physical part 15 were being squeezed from the contact member 11-1 and the contact member 11-3. As illustrated in FIG. 12B, the pseudo-force sense generation apparatus 3 may be operated such that the vibration element 131-1 performs the asymmetric vibration $A_1$ for the user to perceive the pseudo-force sense in the $U_1$ direction, the vibration element 131-2 performs the asymmetric vibration $A_2$ for the user to perceive the pseudo-force sense in the $D_2$ direction, the vibration element 131-3 performs the asymmetric vibration $A_3$ for the user to perceive the pseudo-force sense in the $U_3$ direction, and the vibration element 131-4 performs the asymmetric vibration $A_4$ for the user to perceive the pseudo-force sense in the $D_4$ direction (fourth squeezing operation). These asymmetric vibrations $A_1$ to $A_4$ are simultaneously performed. Thereby the user more clearly perceives the pseudo-force sense as if the physical part 15 were being squeezed from the contact member 11-2 and the contact member 11-4. If the joining member 12 is formed of roughly a rigid body which has slight flexibility, an operation of continuing the third squeezing operation (FIG. 12A) for time $T_1$ and an operation of continuing the fourth squeezing operation (FIG. 12B) for time $T_2$ may be alternately repeated. Thereby the user more clearly perceives the pseudo-force sense as if the physical part 15 were being squeezed from the contact members 11-1, 11-2, 11-3 and 11-4. In these examples too, if the phases of the asymmetric vibrations are synchronized, the user can perceive an even clearer pseudo-force sense.

As illustrated in FIG. 13A, the operation starts with the vibration element 131-1 starting the asymmetric vibration $A_1$ for the user to perceive the pseudo-force sense in the $D_1$ direction (first operation). After the first operation, the vibration element 131-2 starts the asymmetric vibration $A_3$ for the user to perceive the pseudo-force sense in the $D_2$ direction (second operation), as illustrated in FIG. 13B. After the second operation, the vibration element 131-3 starts the asymmetric vibration $A_3$ for the user to perceive the pseudo-force sense in the $D_3$ direction (third operation), as illustrated in FIG. 14A. After the third operation, the vibration element 131-4 may start the asymmetric vibration $A_4$ for the user to perceive the pseudo-force sense in the $D_4$ direction (fourth operation), as illustrated in FIG. 14B. Here the i-th operation may be ended after the j-th operation is started (j=(i mod N)+1). Thereby the pseudo-force sense is provided such that the physical part 15 is pushed from the contact member 11-1, then the physical part 15 is pushed from the contact member 11-2, then the physical part 15 is pushed from the contact member 11-3, then the physical part 15 is pushed from the contact member 11-4. After the i-th operation is started, the j-th operation may be started while the i-th operation is performed. Even after the j-th operation is started, the i-th operation may be continued. The i-th operation that started may be ended after continuing the operation for a predetermined time, or may be ended after all of the first operation to the fourth operation are started. Thereby the pseudo-force sense as if the surrounding of the physical part 15 were being squeezed in the sequence of the contact member 11-1, 11-2, 11-3 and 11-4, can be provided. In these examples too, if the phases of the asymmetric vibrations are synchronized, the user can perceive an even clearer pseudo-force sense.

In the above mentioned n-th operation, the vibration element 131-*n* may perform the asymmetric vibration $A_n$ for the user to perceive the pseudo-force sense in the $U_n$ direction, as illustrated in FIG. 15A, FIG. 15B, FIG. 16A and FIG. 16B, instead of the vibration element 131-*n* performing the asymmetric vibration $A_n$ for the user to perceive the pseudo-force sense in the $D_n$ direction. In the case where the vibration element 131-*n* performs the asymmetric vibration $A_n$ for the user to perceive the pseudo-force sense in the $U_n$ direction, the force based on this asymmetric vibration $A_n$ is transferred from the contact member 11-*n* to the contact member 11-*m* via the joining member 12. Here m=1+((n mod 4)+1}mod 4. Thereby the contact member 11-*m* can provide a pseudo-force sense in the $D_m$ direction to the physical part 15, and a function similar to the above mentioned m-th operation can be implemented.

<Characteristics of Embodiment 3>

The user can merely mount the physical part 15 in the mounting region 14, and need not hold the pseudo-force sense generation apparatus 3. Further, the vibration element 131-*n* performs the cyclic asymmetric vibration $A_n$, not in the tangential direction of the outer peripheral surface of the physical part 15, but along the line $L_1$ (e.g. normal line of the outer peripheral surface 151-*n* of the physical part 15) passing through the virtual point $O_1$ in the physical part 15 disposed in the mounting region 14 and the contact member 11-*n*. Therefore the force based on the asymmetric vibration $A_n$ is sufficiently transferred to the physical part 15, and the user can perceive the pseudo-force sense appropriately. Furthermore, various pseudo-force senses can be provided by the control of the vibration elements 131-1, 131-2, 131-3 and 131-4.

For example, by repeating the "first period" when the first squeezing operation or the third squeezing operation is performed (FIG. 11A, FIG. 12A), and the "second period" when the second squeezing operation or the fourth squeezing operation is performed (FIG. 11B, FIG. 12B), the pseudo-force sense, as if the physical part 15 were being squeezed from the contact members 11-1, 11-2, 11-3 and 11-4, can be provided. The "first period" is a period when the vibration element 131-1 ($i_{11}$-th vibration element) performs the asymmetric vibration $A_1$ ($i_{11}$-th asymmetric vibration) for the user to perceive the pseudo-force sense in the direction from the contact member 11-1 ($i_{11}$-th contact member) to the virtual point $O_1$ ($i_{11}$-th virtual point), while the vibration element 131-3 ($i_{12}$-th vibration element) performs the asymmetric vibration $A_3$ ($i_{12}$-th asymmetric vibration) for the user to perceive the pseudo-force sense in the direction from the contact member 11-3 ($i_{12}$-th contact member) to the virtual point $O_1$ ($i_{12}$-th virtual point). The "second period" is a period when the vibration element 131-2 ($i_{21}$-th vibration element) performs the asymmetric vibration $A_2$ ($i_{21}$-th asymmetric vibration) for the user to perceive the pseudo-force sense in the direction from the contact member 11-2 ($i_{21}$-th contact member) to the virtual point $O_1$ ($i_{21}$-th virtual point), while the vibration element 131-4 ($i_{22}$-th vibration element) performs the asymmetric vibration $A_4$ ($i_{22}$-th asymmetric vibration) for the user to perceive the pseudo-force sense in the direction from the contact member 11-4 ($i_{22}$-th contact member) to the virtual point $O_1$ ($i_{22}$-th virtual point). These periods satisfy the following conditions. The conditions are: the proper subset $subset_1 \subset \{1, \ldots, N\}$ and the proper subset $subset_2 \subset \{1, \ldots, N\}$ are different from each other; the proper subset $subset_{11} \subset subset_1$ and the proper subset $subset_{12} \subset subset_1$ are different from each other; the proper subset $subset_{21} \subset subset_2$ and the proper subset $subset_{22} \subset subset_2$ are different from each other; $i_{11} \in subset_{11}$; $i_{12} \in subset_{12}$; $i_{21} \in subset_{21}$; $i_{22} \in subset_{22}$; $i_{11} \neq i_{12}$; $i_{21} \neq i_{22}$; the "$i_{11}$-th virtual point", the "$i_{12}$-th virtual point", the "$i_{21}$-th virtual point" and the "$i_{22}$-th virtual point" are disposed inside the mounting region 14; the "$i_{11}$-th contact member" and the "$i_{12}$-th contact member" face each other; the "$i_{11}$-th virtual point" and the "$i_{12}$-th virtual point" are disposed between the "$i_{11}$-th contact member" and the "$i_{12}$-th contact member"; and the "$i_{21}$-th contact member" and the "$i_{22}$-th contact member" face each other; and the "$i_{21}$-th virtual point" and the "$i_{22}$-th virtual point" are disposed between the "$i_{21}$-th contact member" and the "$i_{22}$-th contact member".

Embodiment 4

Embodiment 4 will be described. Embodiment 4 is a modification of Embodiments 2 and 3, and is an example when N=3. As illustrated in FIG. 17A and FIG. 17B, a pseudo-force sense generation apparatus 4 of Embodiment 4 includes: N number of contact members 11-1, . . . , 11-N (first contact member, . . . , N-th contact member); a joining member 12; and N number of vibration generation apparatuses 31-1, . . . , 31-N (first vibration generation apparatus, . . . , N-th vibration generation apparatus). The vibration generation apparatus 13-$n$ includes the vibration element 131-$n$ and the support unit 132-$n$. Here n=1, . . . , N and N=3.

<<Contact Member 11-$n$>>

The contact member 11-$n$ of Embodiment 4 is a plate member. The contact member 11-1 to the contact member 11-3 are disposed along the outer peripheral surface 141 of the mounting region 14. In other words, the mounting region 14 is surrounded by the contact member 11-1 to the contact member 11-3. The plate surface 111-$n$ is disposed on the tangential plane of the outer peripheral surface 141 of the mounting region 14, for example.

<<Joining Member 12>>

The joining member 12 of Embodiment 4 directly joins the contact member 11-1 to the contact member 11-3. The rest is the same as Embodiment 1.

<<Vibration Generation Apparatus 13-$n$>>

A support unit 132-$n$ of the vibration generation apparatus 13-$n$ is fixed to the other plate surface 112-$n$ (opposite of the plate surface 111-$n$) of the contact member 11-$n$. The vibration element 131-$n$ of the vibration generation apparatus 13-$n$ performs a cyclic asymmetric vibration $A_n$ to the support unit 132-$n$ along the line $L_n$. The line $L_n$ is a line passing through the virtual point $O_n$ (n-th virtual point) in the mounting region 14 and the contact member 11-$n$. In Embodiment 4, $O_1 = O_2 \neq O_3$, but the n-th virtual points may be the same or different from each other. The line $L_n$ passes through the virtual point $O_n$ (n-th virtual point) in the mounting region 14 and a point $P_n$ of the contact member 11-$n$. An example of the line $L_n$ is a normal line at one point $P_n$ on the outer peripheral surface 141 of the mounting region 14.

When the vibration element 131-$n$ performs the cyclic asymmetric vibration $A_n$ to the support unit 132-$n$ along the line $L_n$, the reaction force (force along the line $L_n$) thereof is transferred to the support unit 132-$n$. The force transferred to the support unit 132-$n$ (force along the line $L_n$) is further transferred to the contact member 11-$n$. By this force, the contact member 11-$n$ performs the cyclic asymmetric vibration $A_n'$ along the line $L_n$. The reaction force of the asymmetric vibration $A_n$ of the vibration element 131-$n$ is also transferred to other contact members 11-$n_5$ via the joining member 12 (here $n_5 \in \{1, \ldots, N\}$, $n_5 \neq n$).

<Control System>

The control system of Embodiment 4 includes: a control signal output unit 101 that generates a control signal; signal amplifiers 102-$n$ (n=1, . . . , N) which amplify the control signal outputted from the control signal output unit 101; and the pseudo-force sense generation apparatus 4, including the vibration generation apparatus 13-$n$, which is driven by the control signal amplified by the signal amplifier 102-$n$.

<Operation>

As described in Embodiment 1, the user places the physical part 15 in the mounting region 14. When the control signal is supplied to the vibration generation apparatus 13-$n$ (n=1, . . . , 4), and the vibration element 131-$n$ of the vibration generation apparatus 13-$n$ performs the cyclic asymmetric vibration $A_n$ along the line $L_n$, various pseudo-force senses according to the asymmetric vibration $A_n$ can be provided.

Figure 18:
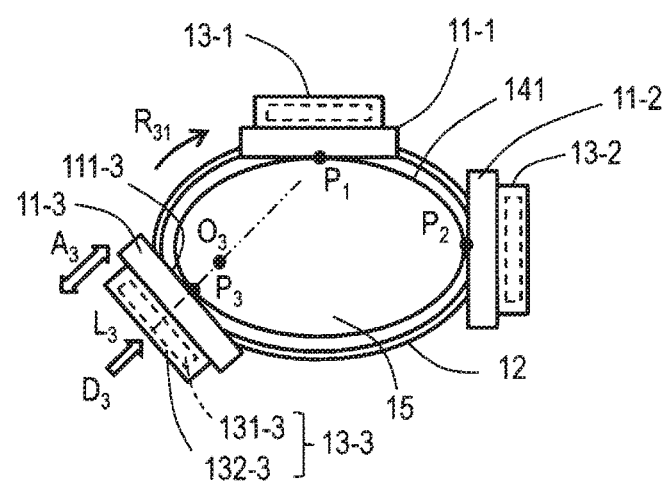
FIG. 18 is a diagram for describing the operation of Embodiment 4.

For example, as illustrated in FIG. 18, if the vibration element 131-3 performs the asymmetric vibration $A_3$ for the user to perceive the pseudo-force sense in the $D_3$ direction, the user perceives the pseudo-force sense as if the physical part 15 were rotating in a clockwise direction $R_{31}$. This is because the virtual point $O_3$ is located outside the center (center of gravity) of the physical part 15. On the other hand, if the vibration element 131-1 performs the asymmetric vibration $A_1$ for the user to perceive the pseudo-force sense in the $D_1$ direction, or the vibration element 131-2 performs the asymmetric vibration $A_2$ for the user to perceive the pseudo-force sense in the $D_2$ direction, the user perceives the pseudo-force sense in the translational direction. This is because the virtual points $O_1$ and $O_2$ are located near the center (center of gravity) of the physical part 15.

<Characteristics of Embodiment 4>

The user can merely mount the physical part 15 in the mounting region 14, and need not hold the pseudo-force sense generation apparatus 3. Further, the vibration element 131-$n$ performs the cyclic asymmetric vibration $A_n$, not in the tangential direction of the outer peripheral surface of the physical part 15, but along the line $L_1$ (e.g. normal line of the outer peripheral surface 151-$n$ of the physical part 15) passing through the virtual point $O_n$ in the physical part 15 disposed in the mounting region 14 and the contact member 11-$n$. Therefore the force based on the asymmetric vibration $A_n$ is sufficiently transferred to the physical part 15, and the user can perceive the pseudo-force sense appropriately. Furthermore, various force senses can be provided by the control of the vibration elements 131-1, 131-2 and 131-3.

Embodiment 4

The plate surface 111-$n$ of the above mentioned contact member 11-$n$ (n=1, . . . , N) on the mounting region 14 side may have a shape which does not cause slippage from the physical part 15 very much. It is preferable that the plate surface 111-$n$ has a shape which does not cause slippage from the surface of the physical part 15 very much because the contact member 11-$n$ applies force in the direction of pushing toward the physical part 15. For example, irregularities may be formed on the plate surface 111-$n$. It is preferable that the shape of the irregularities do not cause a sense of pain to the physical part 15. If the user perceives pain, this generates noise and interrupts perceiving the pseudo-force sense clearly. For example, it is preferable that the width of one convex portion of the irregularities is 1 mm or more, and the height thereof is 2 mm or less. However the sizes of the irregularities are not limited to this, as long as the user does not perceive pain.

FIG. 19A to FIG. 19D illustrate examples of a preferable configuration of the plate surface 111-$n$ on the mounting region 14 side. In the plate surface 111-$n$ illustrated in FIG. 19A, a plurality of cylindrical convex portions 511$b$-$n$ are arrayed on the bottom surface 511$a$-$n$ in a lattice pattern. For example, the radius of the convex portion 511$b$-$n$ is 2 mm, the height thereof is 2 mm, and the distance between the centers of adjacent convex portions is 10 mm. In the plate surface 111-$n$ illustrated in FIG. 19B, a plurality of cylindrical convex portions 611$b$-$n$ are arrayed on the bottom surface 611$a$-$n$ in a lattice pattern, so that the plane filling rate becomes the maximum. For example, the radius of the convex portion 511$b$-$n$ is 2 mm, the height thereof is 2 mm, and the interval of the convex portions is 10 mm. In the plate surface 111-$n$ illustrated in FIG. 19C, a plurality of prismatic convex portions 711$b$-$n$ are arrayed on the bottom surface 711$a$-$n$, so as to be parallel with each other. For example, the width of the convex portion 711$b$-$n$ is 2 mm, the height thereof is 2 mm, and the interval of the convex portions is 5 mm. The plate surface 111-$n$ illustrated in FIG. 19D is divided into four square regions, and a plurality of prismatic convex portions 811$b$-$n$ are arrayed on the bottom surface 811$a$-$n$ of each region, so as to be parallel with each other. The convex portions 811$b$-$n$ of adjacent squares are disposed roughly vertical to each other. For example, the width of the convex portion 811$b$-$n$ is 2 mm, the height thereof is 2 mm, and the interval of the convex portions is 5 mm.

[Other Modifications]

Each embodiment described above is merely an example of the present invention, and is not intended to limit the invention. For example, in each embodiment, the control signal output unit 101 and the signal amplifier 102-$n$ are disposed outside the pseudo-force sense generation apparatus, but the pseudo-force sense generation apparatus may include the control signal output unit 101 and the signal amplifier 102-$n$.

In each embodiment, the vibration generation apparatus 13-$n$ and the contact member 11-$n$ are separated, but the vibration generation apparatus 13-$n$ and the contact member 11-$n$ may be integrated. For example, the support unit 132-$n$ and the contact member 11-$n$ may be integrated.

In Embodiment 2 to Embodiment 4, the joining member 12 is formed of roughly a rigid body, but in Embodiment 2 to Embodiment 4, the joining member 12 may be formed of an elastic body.

In the case of implementing the control signal output unit 101 by computer, the processing content of the functions, which the control signal output unit 101 should have, are written in a program. By executing this program using the computer, the processing functions of the control signal output unit 101 are implemented by computer. The written program of this processing content can be recorded in a computer-readable recording medium. An example of the computer-readable recording medium is a non-transitory recording medium. Examples of such a recording medium are: a magnetic recording unit, an optical disk, a magneto-optical recording medium, and a semiconductor memory.

This program is distributed by selling, transferring or lending a portable recording medium (e.g. DVD, CD-ROM) that stores the program, for example. Further, this program may be stored on a storage apparatus of a server in advance, and be distributed by transferring the program from the server to another computer via a network.

When the computer that executes this program, the computer stores the program recorded on the portable recording medium or the program, which is transferred from the server, to the storage device of this computer first. Then when the processing is executed, this computer reads the program stored on the storage device, and executes the processing according to the read-program. As another mode of executing this program, the computer may read the program directly from the portable recording medium and execute the processing according to the program. Further, each time a program is transferred from the server to this computer, the computer may execute the processing sequentially according to the received-program. This processing may be executed by an application service provider (ASP) based service, which implements the processing functions only by the execution instruction and acquiring the result, without transferring the program from the server to this computer.

INDUSTRIAL APPLICABILITY

By the above configuration, the pseudo-force sense can be provided to the physical part in a hands free state. Thereby the user can perceive the pseudo-force sense even in a state of holding another tool by hand. For example, the present invention can be applied to such a usage as supporting an operation appropriately by providing an exemplary force sense.

REFERENCE SIGNS LIST 1 to 3 Pseudo-force sense generation apparatus
11-$n$ Contact member
12 Joining member
13-$n$ Vibration generation apparatus
131-$n$ Vibration element

The invention claimed is:

1. A computer-implemented method for generating a pseudo-force sense, the method comprising:
   cyclically performing, by a first vibration element during a first time period, a first asymmetric vibration along a first line passing through a first virtual point in a mounting region and a first contact member, the mount region comprising a three-dimensional space occupied by a body of a user, the first contact member joining a second contact member, the first contact member and the second contact member being disposed along an outer peripheral surface of the mounting region, and the first virtual point being disposed between the first contact member and the second contact member;
   transferring, by the first vibration element, a first force as a first pseudo-force sense in a direction along the first line based on the first asymmetric vibration to the first contact member; and
   transferring the first force as the first pseudo-force sense in the direction along the first line based on the first asymmetric vibration to the second contact member via a joining member, the joining member joining the first contact member and the second contact member.

2. The computer-implemented method of claim 1, wherein
   the first contact member and the second contact member face each other, and wherein the first line passes through the first contact member, the second contact member, and the first virtual point.

3. The computer-implemented method of claim 1, wherein
   the first line is a normal line through a point on the outer peripheral surface of the mounting region.

4. The computer-implemented method of claim 1, the method further comprising:
   cyclically performing, by the first contact member, a second asymmetric vibration in the direction along the first line based on the first asymmetric vibration using the first force along the first line; and
   cyclically performing, by the second contact member, a third asymmetric vibration in the direction along the first line based on the first asymmetric vibration using the first force along the first line, the third asymmetric vibration being distinct from the second asymmetric vibration.

5. The computer-implemented method of claim 1, the method further comprising:
   maintaining, by the joining member, a distance of the second contact member from the first contact member within a predetermined range.

6. The computer-implemented method of claim 1, the method further comprising:
   cyclically performing, by a second vibration element during a second time period, a second asymmetric vibration along a second line passing through a second virtual point in a mounting region and a third contact member, the third contact member joining a fourth contact member, the third contact member and the fourth contact member being disposed along the outer peripheral surface of the mounting region, and the second virtual point being disposed between the third contact member and the fourth contact member;
   transferring, by the second vibration element, a second force as a second pseudo-force sense in a direction along the second line based on the second asymmetric vibration to the third contact member; and
   transferring the second force as the second pseudo-force sense in the direction along the second line based on the second asymmetric vibration to the fourth contact member.

7. The computer-implemented method of claim 6, wherein the third contact member and the fourth contact member facing each other, wherein the second line passes through the third contact member, the fourth contact member, and the second virtual point, and wherein the first time period and the second time period alternate in sequence.

8. A system comprising: a processor; and
   a memory storing computer executable instructions that when executed by the at least one processor cause the system to:
   cyclically perform, by a first vibration element during a first time period, a first asymmetric vibration along a first line passing through a first virtual point in a mounting region and a first contact member, the mount region comprising a three-dimensional space occupied by a body of a user, the first contact member joining a second contact member, the first contact member and the second contact member being disposed along an outer peripheral surface of the mounting region, and the first virtual point being disposed between the first contact member and the second contact member;
   transfer, by the first vibration element, a first force as a first pseudo-force sense in a direction along the first line based on the first asymmetric vibration to the first contact member; and
   transfer the first force as the first pseudo-force sense in the direction along the first line based on the first asymmetric vibration to the second contact member via a joining member, the joining member joining the first contact member and the second contact member.

9. The system of claim 8, wherein
   the first contact member and the second contact member face each other, and wherein the first line passes through the first contact member, the second contact member, and the first virtual point.

10. The system of claim 8, wherein the first line is a normal line through a point on the outer peripheral surface of the mounting region.

11. The system of claim 8, the computer executable instructions when executed further cause the system to:
    cyclically perform, by the first contact member, a second asymmetric vibration in the direction along the first line based on the first asymmetric vibration using the first force along the first line; and
    cyclically perform, by the second contact member, a third asymmetric vibration in the direction along the first line based on the first asymmetric vibration using the first force along the first line, the third asymmetric vibration being distinct from the second asymmetric vibration.

12. The system of claim 8, the computer executable instructions when executed further cause the system to:
    maintain, by the joining member, a distance of the second contact member from the first contact member within a predetermined range.

13. The system of claim 8, the computer executable instructions when executed further cause the system to:
    cyclically perform, by a second vibration element during a second time period, a second asymmetric vibration along a second line passing through a second virtual point in a mounting region and a third contact member, the third contact member joining a fourth contact member, the third contact member and the fourth contact member being disposed along the outer peripheral surface of the mounting region, and the second virtual point being disposed between the third contact member and the fourth contact member;

transfer, by the second vibration element, a second force as a second pseudo-force sense in a direction along the second line based on the second asymmetric vibration to the third contact member; and transfer the second force as the second pseudo-force sense in the direction along the second line based on the second asymmetric vibration to the fourth contact member.

14. The system of claim 13, wherein the third contact member and the fourth contact member facing each other, wherein the second line passes through the third contact member, the fourth contact member, and the second virtual point, and wherein the first time period and the second time period alternate in sequence.

15. A computer-readable non-transitory recording medium storing computer-executable instructions that when executed by a processor cause a computer system to:

cyclically perform, by a first vibration element during a first time period, a first asymmetric vibration along a first line passing through a first virtual point in a mounting region and a first contact member, the mount region comprising a three-dimensional space occupied by a body of a user, the first contact member joining a second contact member, the first contact member and the second contact member being disposed along an outer peripheral surface of the mounting region, and the first virtual point being disposed between the first contact member and the second contact member;

transfer, by the first vibration element, a first force as a first pseudo-force sense in a direction along the first line based on the first asymmetric vibration to the first contact member; and transfer the first force as the first pseudo-force sense in the direction along the first line based on the first asymmetric vibration to the second contact member via a joining member, the joining member joining the first contact member and the second contact member.

16. The computer-readable non-transitory recording medium of claim 15, wherein the first contact member and the second contact member face each other, wherein the first line passes through the first contact member, the second contact member, and the first virtual point, and wherein the first line is a normal line through a point on the outer peripheral surface of the mounting region.

17. The computer-readable non-transitory recording medium of claim 15, the computer-executable instructions when executed further causing the system to:

cyclically perform, by the first contact member, a second asymmetric vibration in the direction along the first line based on the first asymmetric vibration using the first force along the first line; and cyclically perform, by the second contact member, a third asymmetric vibration in the direction along the first line based on the first asymmetric vibration using the first force along the first line, the third asymmetric vibration being distinct from the second asymmetric vibration.

18. The computer-readable non-transitory recording medium of claim 15, the computer-executable instructions when executed further causing the system to:

maintain, by the joining member, a distance of the second contact member from the first contact member within a predetermined range.

19. The computer-readable non-transitory recording medium of claim 15, the computer-executable instructions when executed further causing the system to:

cyclically perform, by a second vibration element during a second time period, a second asymmetric vibration along a second line passing through a second virtual point in a mounting region and a third contact member, the third contact member joining a fourth contact member, the third contact member and the fourth contact member disposed along the outer peripheral surface of the mounting region, and the second virtual point being disposed between the third contact member and the fourth contact member;

transfer, by the second vibration element, a second force as a second pseudo-force sense in a direction along the second line based on the second asymmetric vibration to the third contact member; and transfer the second force as the second pseudo-force sense in the direction along the second line based on the second asymmetric vibration to the fourth contact member.

20. The computer-readable non-transitory recording medium of claim 19, wherein the third contact member and the fourth contact member facing each other, wherein the second line passes through the third contact member, the fourth contact member, and the second virtual point, and wherein the first time period and the second time period alternate in sequence.

* * * * *